US011156818B2

(12) United States Patent
Fiolka et al.

(10) Patent No.: US 11,156,818 B2
(45) Date of Patent: Oct. 26, 2021

(54) FLEXIBLE LIGHT SHEET GENERATION BY FIELD SYNTHESIS

(71) Applicants:The Board of Regents of The University of Texas System, Austin, TX (US); Northwestern University, Evanston, IL (US)

(72) Inventors: Reto Fiolka, Dallas, TX (US); Mark Kittisopikul, Dallas, TX (US); Bo-Jui Chang, Dallas, TX (US)

(73) Assignees: The Board of Regents of The University of Texas System, Austin, TX (US); Northwestern University, Evanston, IL (US)

( * ) Notice: Subject to any disclaimer, the term of this patent is extended or adjusted under 35 U.S.C. 154(b) by 0 days.

(21) Appl. No.: 16/539,898

(22) Filed: Aug. 13, 2019

(65) Prior Publication Data
US 2020/0049968 A1 Feb. 13, 2020

Related U.S. Application Data

(60) Provisional application No. 62/718,325, filed on Aug. 13, 2018.

(51) Int. Cl.
*G02B 21/00* (2006.01)
*G01N 21/64* (2006.01)

(52) U.S. Cl.
CPC ..... *G02B 21/0032* (2013.01); *G01N 21/6458* (2013.01); *G02B 21/008* (2013.01); *G02B 21/0036* (2013.01); *G02B 21/0076* (2013.01); *G01N 2021/6463* (2013.01)

(58) Field of Classification Search
CPC ....... G01N 2021/6463; G01N 21/6458; G02B 21/0032; G02B 21/0036; G02B 21/0076; G02B 21/008
See application file for complete search history.

(56) References Cited

U.S. PATENT DOCUMENTS

| | | | |
|---|---|---|---|
| 5,440,426 A * | 8/1995 | Sandstrom | G02B 21/00 359/559 |
| 6,055,097 A | 4/2000 | Lanni et al. | |
| 9,500,846 B2 | 11/2016 | Betzig et al. | |
| 9,891,421 B2 | 2/2018 | Betzig | |

(Continued)

OTHER PUBLICATIONS

Bailey et al., "Enhancement of axial resolution in fluorescence microscopy by standing-wave excitation," *Nature*, 1993, 366(6450):44-48.

(Continued)

*Primary Examiner* — Joon Kwon
(74) *Attorney, Agent, or Firm* — Polsinelli PC

(57) ABSTRACT

A light sheet microscopy apparatus has a light source, a spatial light filter, a scanning device positioned between the light source and the spatial light filter, an imaging device, a computer readable medium, and a computer processor coupled to the light source, the scanning device, the imaging device, and the computer-readable medium. The computer processor is configured to operate the light source to generate a light beam, control the scanning device to scan the light beam across the spatial light filter to generate the light sheet, and utilize the imaging device to capture one or more images of light emitted by a sample illuminated by the one or more light sheets.

23 Claims, 17 Drawing Sheets

(56) References Cited

U.S. PATENT DOCUMENTS

| | | | |
|---|---|---|---|
| 2005/0218124 A1 | 10/2005 | Jennings et al. | |
| 2013/0286181 A1 | 10/2013 | Betzig et al. | |
| 2015/0168732 A1 | 6/2015 | Singer et al. | |
| 2015/0198794 A1* | 7/2015 | Rondeau | G02B 21/0048 359/390 |
| 2016/0195705 A1 | 7/2016 | Betzig et al. | |
| 2016/0214107 A1* | 7/2016 | Viasnoff | G01N 21/03 |
| 2017/0351082 A1* | 12/2017 | Ripoll Lorenzo | G02B 21/26 |
| 2018/0011303 A1 | 1/2018 | Loy et al. | |

OTHER PUBLICATIONS

Bewersdorf, et al., "Comparison of I5M and 4Pi-microscopy," *Journal of Microscopy*, 2006, 222(2):105-117.

Chang, et al., "Universal light-sheet generation with field synthesis," *Nature Methods*, 2019.

Chen, et al. "Lattice Light Sheet Microscopy: Imaging Molecules to Embryos at High Spatiotemporal Resolution," *Science*, 2014, 346(6208):1257998.

Dean, et al., "Deconvolution-free Subcellular Imaging with Axially Swept Light Sheet Microscopy," *Biophysical Journal*, 2015, 108(12):2807-2815.

Durnin, et al., "Comparison of Bessel and Gaussian beams," *Optics Letters*, 1988, 13(2):79-80.

Fahrbach, et al., "A line scanned light-sheet microscope with phase shaped self-reconstructing beams," *Optics Express*, 2010, 18(23):24229-24244.

Fahrbach, et al., "Microscopy with self-reconstructing beams," *Nature Photonics*, 2010, 4:780.

Fahrbach, et al., "Propagation stability of self-reconstructing Bessel beams enables contrast-enhanced imaging in thick media," *Nature Communications*, 2012, 3:632.

Fahrbach, et al., "Self-reconstructing sectioned Bessel beams offer submicron optical sectioning for large fields of view in light-sheet microscopy," *Optics Express*, 2013, 21(9), 11425-11440.

Gustafsson, et al., "I5M: 3D widefield light microscopy with better than 100 nm axial resolution," *Journal of Microscopy*, 1999, 195(Part 1), 10-16.

Gutiérrez-Vega, et al., "Alternative formulation for invariant optical fields: Mathieu beams," *Optics Letters*, 2000, 25(20):1493-1495.

Hell, et al., "Enhancing the Axial Resolution in Far-field Light Microscopy: Two-photon 4Pi Confocal Fluorescence Microscopy," *Journal of Modern Optics*, 1994, 41(4):675-681.

Hell, et al., "Properties of a 4Pi confocal fluorescence microscope," *Journal of the Optical Society of America A*, 1992, 9(12):2159-2166.

Huisken, et al., "Optical Sectioning Deep Inside Live Embryos by Selective Plane Illumination Microscopy," *Science*, 2004, 305(5686):1007-1009.

Keller, et al., "Reconstruction of Zebrafish Early Embryonic Development by Scanned Light Sheet Microscopy," *Science*, 2008, 322(5904):1065-1069.

Lanni, et al., "Excitation field synthesis as a means for obtaining enhanced axial resolution in fluorescence microscopes," *Bioimaging*, 1993, 1(4):187-196.

Loerke, et al., "Cargo and Dynamin Regulate Clathrin-Coated Pit Maturation," *PLOS Biology*, 2009, 7(3): e1000057.

Nagorni, et al., "Coherent use of opposing lenses for axial resolution increase in fluorescence microscopy. I. Comparative study of concepts," *Journal of the Optical Society of America A*, 2001, 18(1):36-48.

Planchon, et al., "Rapid three-dimensional isotropic imaging of living cells using Bessel beam plane illumination," *Nature Methods*, 2011, 8(5):417-423.

Siviloglou, et al., "Observation of Accelerating Airy Beams," *Physical Review Letters*, 2007, 99(21):213901.

Theer, et al., "πSPIM: high NA high resolution isotropic light-sheet imaging in cell culture dishes," *Scientific Reports*, 2016, 6:32880.

Vettenburg, et al., "Light-sheet microscopy using an Airy beam," *Nature Methods*, 2014, 11:541.

Welf, et al., "Quantitative Multiscale Cell Imaging in Controlled 3D Microenvironments," *Developmental Cell*, 2016, 36(4):462-475.

Wu, et al., "Spatially isotropic four-dimensional imaging with dual-view plane illumination microscopy," *Nature Biotechnology*, 2013, 31:1032.

Yang, et al., "Epi-illumination SPIM for volumetric imaging with high spatial-temporal resolution," *Nature Methods*, 2019, 16(6):501-504.

Zhao, et al., "Multicolor 4D Fluorescence Microscopy using Ultrathin Bessel Light Sheets," *Scientific Reports*, 2016, 6:26159.

International Search Report and Written Opinion issued in Corresponding International Patent Application No. PCT/US2019/046393, dated Nov. 20, 2019.

* cited by examiner

FLEXIBLE LIGHT SHEET GENERATION BY FIELD SYNTHESIS

PRIORITY

The present application claims the benefit of U.S. Provisional Patent Application No. 62/718,325, filed Aug. 14, 2018 and entitled "FLEXIBLE LIGHT SHEET GENERATION BY FIELD SYNTHESIS," the contents of which are expressly incorporated herein by reference.

ACKNOWLEDGEMENT OF GOVERNMENT SUPPORT

This invention was made with government support under grant number CA080621 awarded by The National Institutes of Health. The government has certain rights in the invention.

TECHNICAL FIELD

Embodiments of the disclosure include at least microscopy having applications in the fields of cell biology, molecular biology, diagnostics, and medicine, including at least cancer medicine.

BACKGROUND

Due to advances in genome engineering and labeling technologies, biomedical scientists are increasingly probing biological phenomena that lie at the limits of modern imaging capabilities. Advances in biology thus necessitate similarly transformative developments in microscopy, including optical methods that deliver non-invasive, gentle (e.g., low phototoxicity), and high-resolution volumetric imaging. Importantly, these methods must be capable of imaging across the diverse spatial and temporal scales associated with biology, which ranges from inanimate viruses to complex multicellular organisms and ecosystems, with sensitivity down to the single molecule.

For years, confocal microscopy has been the method of choice for subcellular and volumetric imaging of biological specimens. Here, a laser focus is raster scanned throughout a 3D volume, and the resulting fluorescence is focused through a conjugate confocal pinhole and serially detected with a single-element photodetector, thereby providing optical sectioning. However, the exceedingly small dwell-times of modern confocal microscopes (e.g., <2 microseconds) requires high peak illumination intensities, which in addition to the excitation wavelength is a principal determinant of photobleaching and specimen phototoxicity. Further, regions above and below the laser focus are unnecessarily illuminated, resulting in the expenditure of precious photons that do not productively contribute to image formation.

Light sheet fluorescence microscopy (LSFM) adopts an orthogonal imaging geometry whereby the sample is illuminated from the side and fluorescence is collected at 90 degrees with high numerical aperture optics in a widefield format. Because no fluorescence photons are generated above and below the depth-of-focus, optical sectioning is automatically achieved, and unnecessary illumination of the specimen and its fluorophores is avoided. Further, camera-based detection affords million-fold parallelization, as well as large duty-cycle illumination and photon collection, and therefore achieves high-signal to noise ratio imaging with incredibly low peak illumination intensities. As such, LSFM permits unparalleled long-term imaging of dynamic biological specimens.

In the absence of optical aberrations and scattering, the lateral resolution of a LSFM is fully described by the numerical aperture of detection objective and the fluorophore emission wavelength, and the axial resolution is a convolution of the illumination and detection point spread functions (PSFs). Thus, thin illumination beams truncate the detection PSF and improve the axial resolution. However, for Gaussian optics, the effective field of view (~2 Rayleigh lengths) scales non-linearly with the illumination beam waist, and results in axial resolutions that are inadequate for high-resolution volumetric imaging. In contrast, propagation-invariant illumination beams (e.g., Bessel, Airy) maintain a narrow transverse beam profile regardless of the beam length, and can be rapidly swept across the field of view with a mirror galvanometer to create an incoherent time-averaged sheet of light.

In an effort to simultaneously improve the illumination duty cycle and the axial resolution, Chen, Legant, Wang, et al. developed lattice light sheet microscopy (LLSM), which illuminates the specimen with a 2-dimensional optical lattice. In contrast to scanning a pencil-like beam to form a light sheet, the lattice pattern instantaneously form an intensity pattern with a high-duty cycle in the focal plane. In its most commonly used form, the lattice pattern is dithered laterally to form a time averaged light sheet. The instantaneous high-duty results in notably reduced photo-bleaching. Depending on the lattice parameters, the light sheet properties can be tuned from highest axial resolution to highest axial confinement for sensitive measurements. LLSM has been an instant success and has been widely adopted in cell biological research ranging from T-cell to 3D clathrin coated vesicles.

Realizing the advantages of LLSM, many groups have scrambled to build or purchase their instruments. LLSM features a rather complex optical train which is also prohibitively light-ineffective: for rapid imaging, powerful laser sources are necessary to obtain sufficient power levels. This has hampered a more widespread adoption of LLSM.

BRIEF SUMMARY

In an aspect, a light sheet microscopy apparatus has one or more light sources, one or more spatial light filters, one or more scanning devices positioned between the one or more light sources and the one or more spatial light filters, and one or more imaging devices. The apparatus additionally has one or more computer readable media, and one or more computer processors coupled to the one or more light sources, the one or more scanning devices, the one or more imaging devices, and the one or more computer-readable media. The one or more computer processors is configured to operate the one or more light sources to generate one or more light beams, control the one or more scanning devices to scan the one or more light beams across the one or more spatial light filters to generate one or more light sheets, and utilize the one or more imaging devices to capture one or more images of light emitted by a sample illuminated by the one or more light sheets s.

In another aspect, a method of operation for a light sheet microscopy apparatus includes operating one or more light sources to generate one or more light beams. The method additionally includes controlling the one or more scanning devices to scan the one or more light beams across one or more spatial light filters to generate one or more light sheets.

The method also includes utilizing the one or more imaging devices to capture one or more images of light emitted by a sample illuminated by the one or more light sheets.

In another aspect, a light sheet microscopy apparatus has means for generating one or more light beams. The apparatus additionally has means for scanning the one or more light beams across one or more spatial light filters to generate one or more light sheets. The apparatus also has means for capturing one or more images of light emitted by a sample illuminated by the one or more light sheets.

In another aspect, a computer-readable medium has instructions recorded thereon that, when enacted by one or more computer processors, cause the one or more computer processors to operate one or more light sources to generate one or more light beams. The instructions also cause the one or more computer processors to control one or more scanning devices to scan the one or more light beams across one or more spatial light filters to generate one or more light sheets. The instructions also cause the one or more computer processors to utilize one or more imaging devices to capture one or more images of light emitted by a sample illuminated by the one or more light sheets.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION

As used herein, the words "a" and "an" when used in the present specification in concert with the word comprising, including the claims, denote "one or more." Some embodiments of the invention may consist of or consist essentially of one or more elements, method steps, and/or methods of the invention. It is contemplated that any method or composition described herein can be implemented with respect to any other method or composition described herein.

Figure 1:
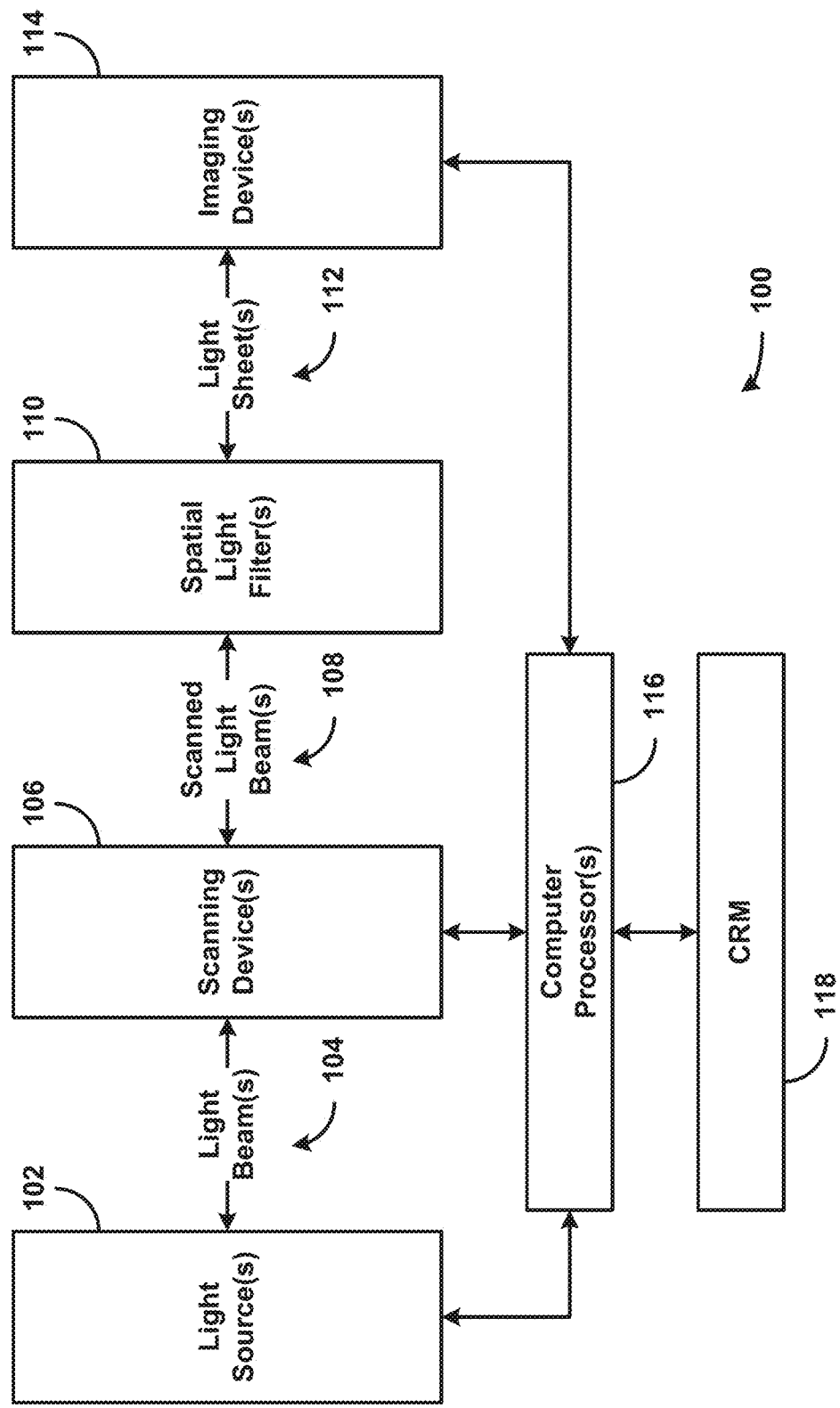
FIG. 1 is a block diagram illustrating elements of a light sheet microscopy apparatus according to one or more aspects of the present disclosure.

Referring to FIG. 1, the present disclosure demonstrates that, by leveraging a newly discovered Fourier theorem, it is possible to synthesize any scanned (or dithered) light sheet, including lattice light sheets, by a simple optical process and with high light efficiency. An example light sheet microscopy apparatus 100 that applies this theorem has one or more light sources 102, one or more spatial light filters 110, one or more scanning devices 106 positioned between the one or more light sources 102 and the one or more spatial light filters 110, and one or more imaging devices 114. The apparatus 100 additionally has one or more computer readable media 118, and one or more computer processors 116 coupled to the one or more light sources 102, the one or more scanning devices 106, the one or more imaging devices 114, and the one or more computer-readable media 118. The one or more computer processors 116 is configured to operate the one or more light sources 102 to generate one or more light beams 104, control the one or more scanning devices 106 to scan the one or more light beams at 108 across the one or more spatial light filters 110 to generate one or more light sheets 112, and utilize the one or more imaging devices 114 to capture one or more images of light emitted by a sample illuminated by the one or more light sheets 112.

In some aspects, it is envisioned that the one or more light sources 102 may include one or more lasers, and the one or more scanning devices 106 may include one or more galvanometric mirrors. It is additionally envisioned that the one or more spatial filters may include a pupil filter that may modulate phase and/or amplitude of the light, and that one or more spatial light-modulators (SLM) may be used such that this filter can be changed dynamically. It is also envisioned that the one or more imaging devices may include one or more cameras, which may have positioning components such as one or more objective lenses that may be connected for positioning by one or more positioning elements, such as piezo electric transducer (PZT) elements. For example, it is envisioned that the one or more light sheets may be passed through an illumination objective prior to illuminating a sample, which causes the sample to emit fluorescence light that is detected by a detection objective and used by the imaging devices to capture images of the sample.

The one or more computer processors 116 may include a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The one or more computer-readable media 118 may include RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Computer-readable media 118 includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

In some implementations, it is envisioned that the one or more computer processors 116 may be configured to move the one or more scanning devices 106 in one dimension, such as laterally in a plane parallel to another plane in which lies a principal impingement surface of the one or more spatial light filters 110. It is additionally envisioned that the one or more computer processors 116 may be configured to scan one or more focused lines across the one or more spatial light filters 110. It is also envisioned that the one or more computer processors 116 may be configured to operate the one or more light sources 102, control the one or more scanning devices 106, and utilize the one or more imaging devices 114 to capture sequential images of light emitted by a sample illuminated by two or more diffraction orders of a lattice pattern, and synthesize the one or more light sheets 112 by adding two or more data sets respectively corresponding to the two or more images.

Figure 2:
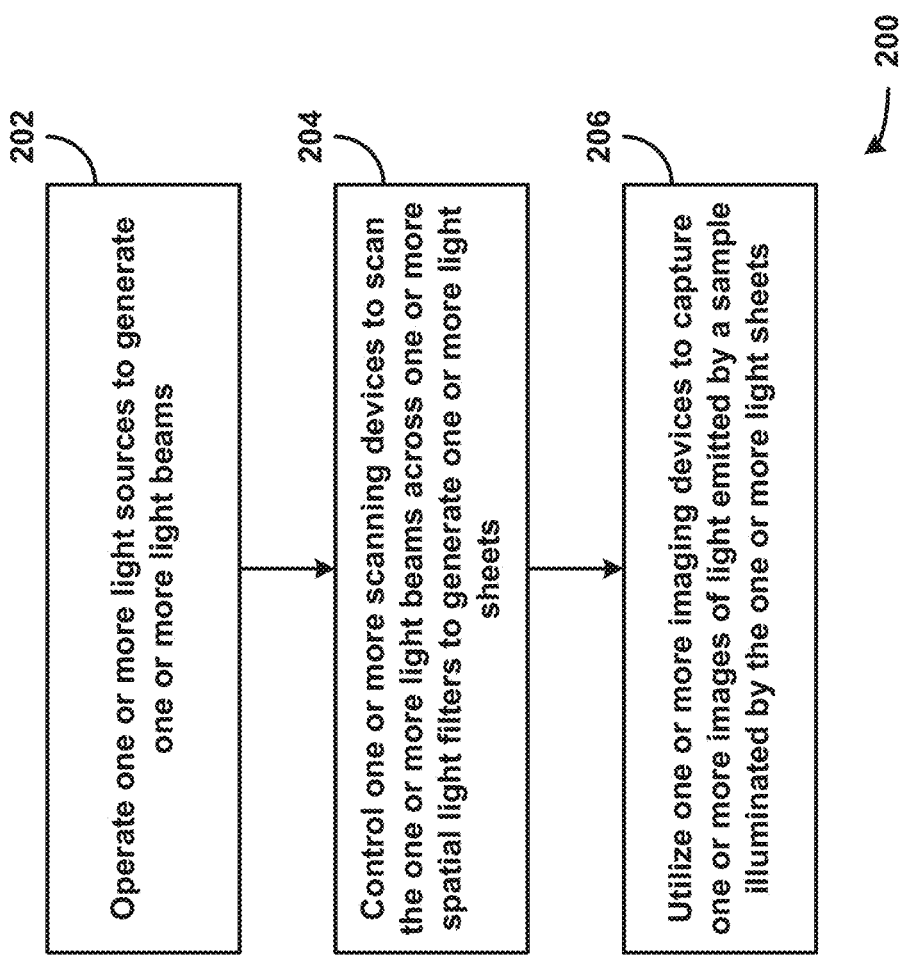
FIG. 2 is a block diagram illustrating example blocks of a method of operation for a light sheet microscopy apparatus according to one or more aspects of the present disclosure.

Turning now to FIG. 2, a method 200 of operation for a light sheet microscopy apparatus begins at block 202. At block 202, the method includes operating one or more light sources to generate one or more light beams. It is envisioned that the one or more light sources may include one or more lasers. Processing may proceed from block 202 to block 204.

At block 204, the method includes controlling the one or more scanning devices to scan the one or more light beams across one or more spatial light filters to generate one or more light sheets. It is envisioned that the one or more scanning devices may include one or more galvanometric mirrors, acousto-optical scanner, rotating polygon mirror or other electro-optical devices for beam scanning. It is additionally envisioned that the one or more spatial filters may include a pupil filter. The pupil filter may be a stationary mask for amplitude or phase. Alternatively or additionally, it may also be comprised of a spatial light-modulator that can be reprogrammed to different filter functions. It is also envisioned that controlling the one or more scanning devices at block 204 may include moving the one or more scanning devices in one dimension, such as laterally in a plane parallel to another plane in which lies a principal impingement surface of the one or more spatial light filters. It is further envisioned that controlling the one or more scanning devices may include scanning one or more focused lines across the one or more spatial light filters. Processing may proceed from block 204 to block 206.

At block 206, the method may include utilizing the one or more imaging devices to capture one or more images of light emitted by a sample illuminated by the one or more light sheets. It is envisioned that the one or more imaging devices may include one or more cameras. It is additionally envisioned that utilizing the one or more cameras to acquire fluorescence light of different wavelength ranges while the sample is illuminated by light sheets of different wavelengths. After block 206, processing may end.

Figure 3:
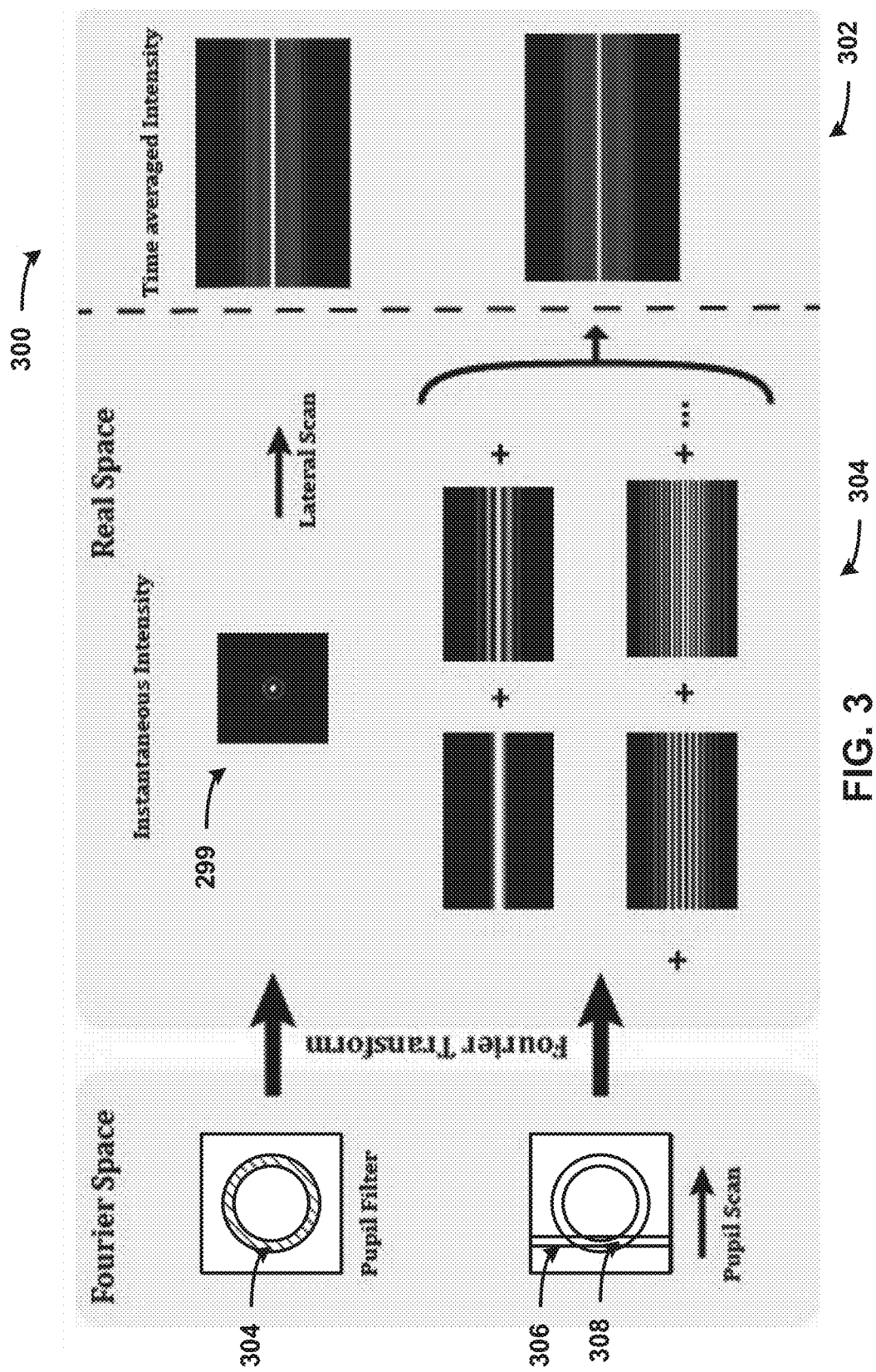
FIG. 3 is a block diagram illustrating light sheet generation by conventional beam scanning and by field synthesis according to one or more aspects of the present disclosure.
Figure 4:
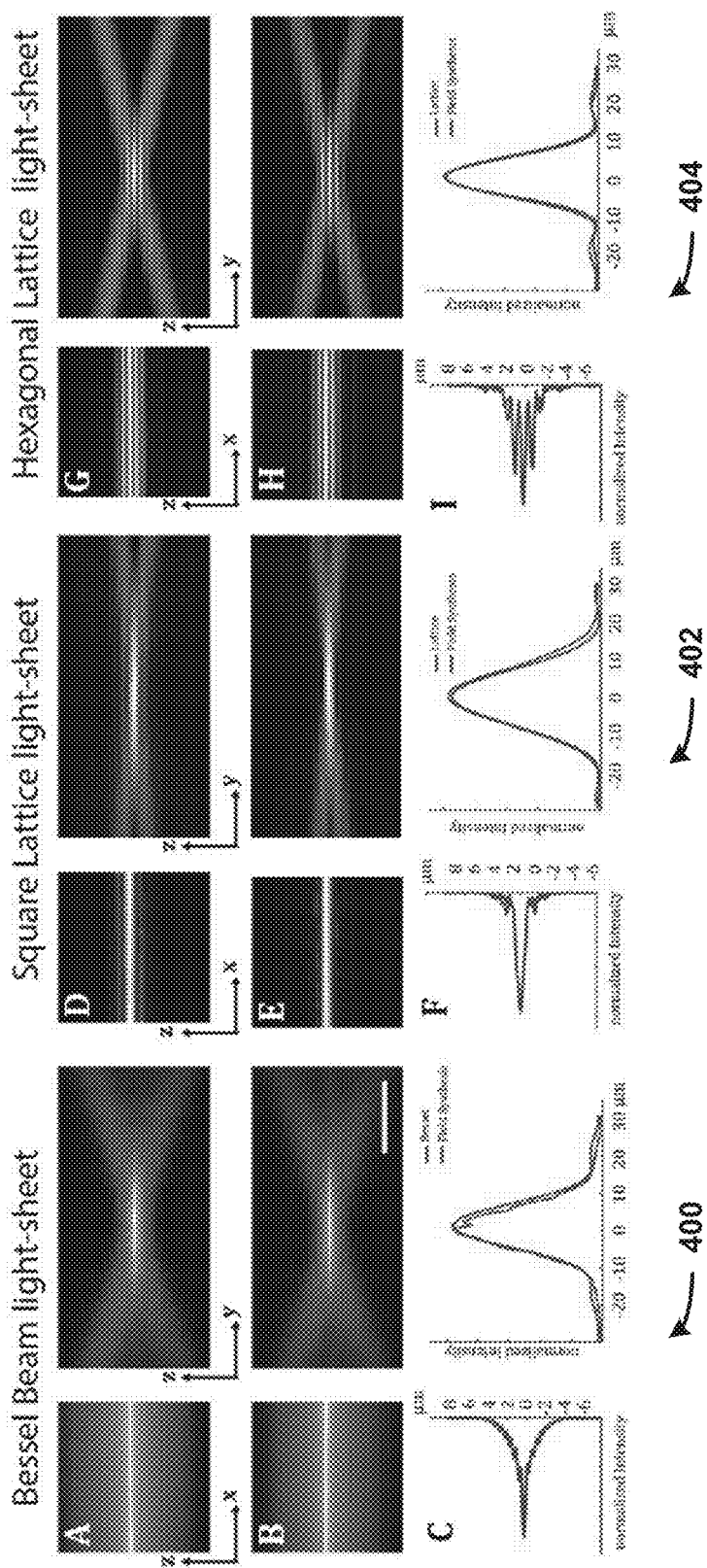
FIG. 4 is a graphical illustration demonstrating a comparison of conventional Bessel and lattice light sheets (top row) and their field synthesis counterparts (middle row).
Figure 5:
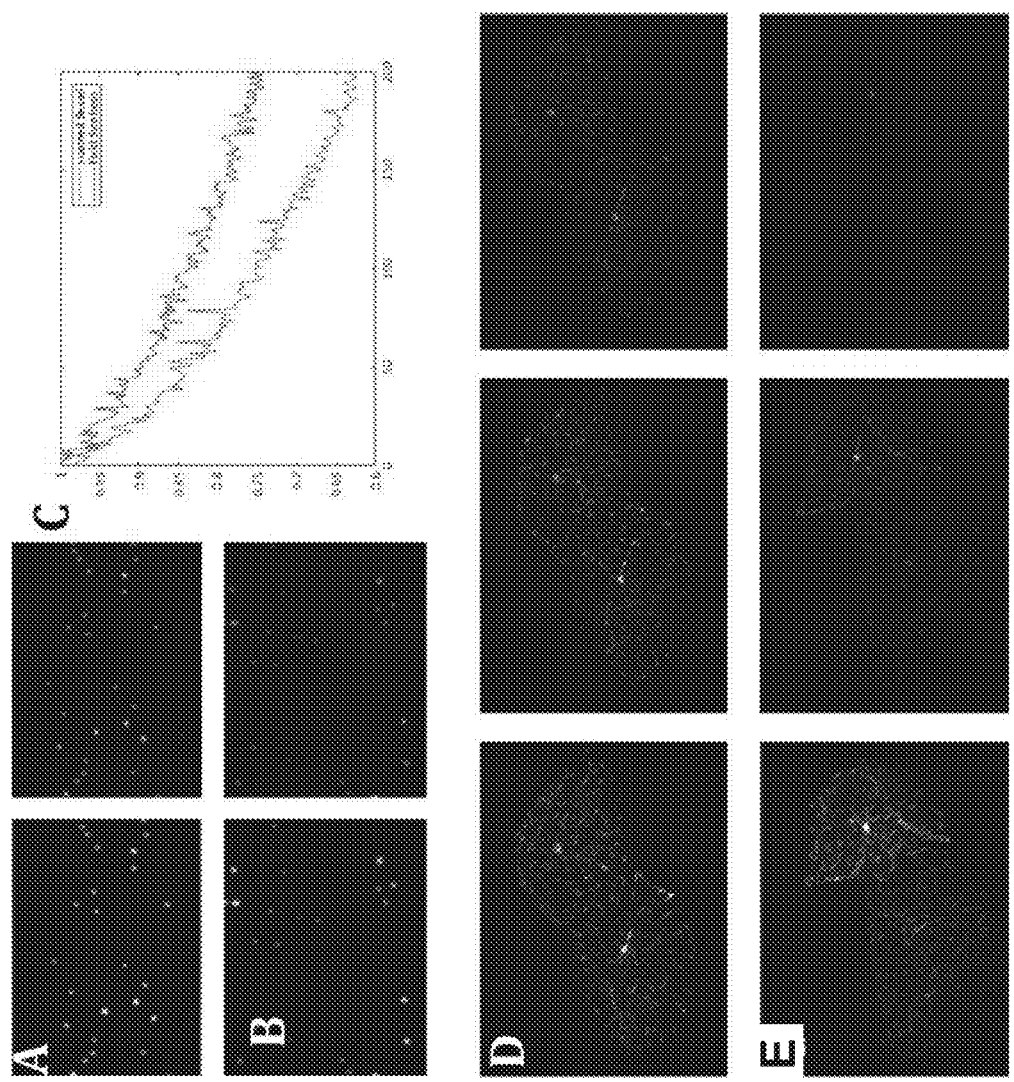
FIG. 5 is a graphical illustrating demonstrating that field synthesis reduces photobleaching over conventionally scanned Bessel beam light sheet microscopy according to one or more aspects of the present disclosure.
Figure 6:
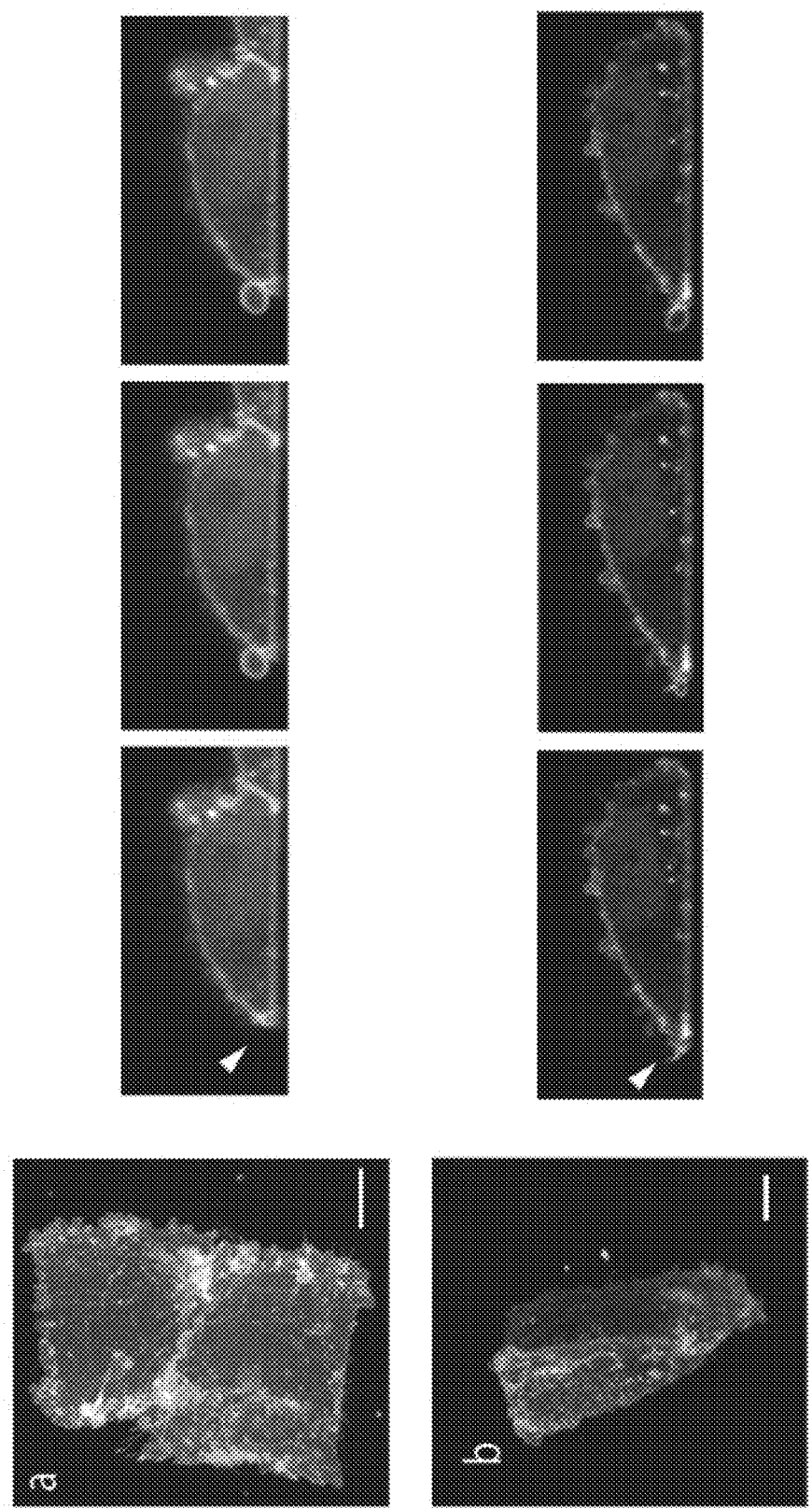
FIG. 6 is a graphical illustration demonstrating that field synthesis doubles volume rate for dual color acquisition compared to lattice light sheet according to one or more aspects of the present disclosure.

Examples of the devices and procedures described above with respect to FIGS. 1 and 2 are further detailed with respect to FIGS. 3-9. For example, FIG. 3 conceptually illustrates a comparison of light sheet generation by conventionally scanned light sheet microscopy and light sheet generation by field synthesis. Additionally, FIG. 4 demonstrates a comparison of conventionally scanned Bessel and lattice light sheets (top row) and their field synthesis counterparts (middle row). Also, FIGS. 5 and 6 illustrate experimental results comparing illumination of a sample using conventionally scanned light sheet generation and light sheet generation by field synthesis. Further, FIGS. 7 and 8 illustrate a light sheet microscopy apparatus having two light paths used to perform the experiments comparing illumination of a sample using conventional light sheet generation and light sheet generation by field synthesis. Still further, FIG. 9 demonstrates another comparison between conventional lattice light sheets and field synthesis.

Lattice light sheet microscopy (LLSM) uses complex interference effects to sculpt its illumination beam and improve its axial resolution and optical sectioning performance. In practice, this lattice may be rapidly dithered to create a time-averaged light sheet. Nevertheless, generating the optical lattice can be challenging and light-inefficient, both of which has limited the adoption of this technology by the greater biological community. Here, we introduce a new Fourier theorem that predicts that any scanned or dithered light sheet, including lattice light sheet, can be synthesized by incoherent superposition of one-dimensional intensity distributions. As a proof of concept, we synthesize a series of Bessel and lattice light sheets, and achieve a high-degree of similarity between coherent methods that use a spatial light-modulator and our incoherent field synthesis method. Importantly, when compared to lattice light sheet microscopy, our method offers significantly greater optical throughput (8-14-fold), a drastically simplified optical design that requires half the optical components, and may be capable of simultaneous multicolor illumination. Further, for 1-photon Bessel beam illumination, we achieve a 100-fold improvement in spatial duty cycle, thereby reducing the peak illumination intensity and reducing the rate of photobleaching.

Referring to FIG. 3, light sheet generation by field synthesis may be demonstrated in mathematical terms. In conventionally scanned light sheet microscopy, a laser focus may be formed in the front focal plane of a lens. To generate a sheet of light, this spot may be rapidly scanned laterally. The black square on the top left of the figure corresponds to a pupil filter, which may be used to shape the laser focus. In this case, an annulus filter is depicted, which only transmits light in the area 304 that is shaded. This particular mask generates a Bessel beam 299, which is simulated in FIG. 3. A time-averaged light sheet 300 is obtained by laterally scanning the Bessel beam 299. Utilizing a field synthesis approach in accordance with aspects of the present disclosure, a focused line 306 may be scanned over the pupil filter, wherein only a portion 308 of the focused line 306 passes through the pupil filter, upon which a time averaged light sheet may be generated in the front focal plane upon one complete scan. Another simulated example 302 of a Bessel beam light sheet is shown that may be synthesized from individual intensity patterns 304 that are created at discreet scan positions on the pupil filter. The Field Synthesis theorem predicts that the sum of these instantaneous intensity patterns 304 creates an averaged light sheet 302 that is identical to the conventionally produced light sheet 300.

A field synthesis theorem may be expressed as follows: the intensity of a 2-D illumination pattern produced by a mask in a front focal plane scanned across one dimension is equivalent to the average intensity in the front focal plane resulting from line scans over the mask in the same direction (i.e., the scan direction over the mask in the same direction as the conventional scan of the 2D illumination pattern in the front focal plane).

It may be shown that an ideal line scan in the Fourier domain results in a 2-D function whose amplitude varies only in one dimension, and that this variation may be determined by a 1-D Fourier transform of the line scan. An ideal focused line on the filter in the Fourier plane may be a shifted delta function of one of the Fourier dimensions, L. The scanning operation may be conducted by varying the shift. The resulting filter windowed by the line scan may be a pointwise multiplicative product of the original filter and the shifted 1-D delta function. This product may be viewed as equivalent to the multiplicative product of shifting the original filter in the opposite direction and an unshifted 1-D delta function. The resulting illumination pattern constructed by the lens inverts the Fourier transform in 2-D. The convolution theorem states that this illumination pattern may be the convolution of (A) the 2-D inverse Fourier transform of the shifted original filter and (B) the 2-D inverse Fourier transform of the 1-D delta function. The 2-D inverse Fourier transform of the shifted original filter (A) may be a complex modulation of the original filter in the illumination domain with the modulation frequency determined by the shift and without change in the amplitude. The 2-D inverse Fourier transform of the 1-D delta function in the Fourier domain (B), $\delta(k_x)$, may be the perpendicular 1-D delta function in the illumination domain, $\delta(y)$. Convolution of the complex modulated filter in the sample domain (A) with a delta function (B) results in a summation across the x-dimension, meaning the resulting amplitude of the illumination pattern varies only in the y-dimension as one would expect for a light sheet. The summation over the complex modulation of the filter in one dimension may be equivalent to performing a 1-D Fourier transform. Thus the variation in the y-dimension of the illumination pattern may be described by a 1-D inverse Fourier transform of the line scan of the filter in the Fourier domain.

One may evaluate the square modulus of the illumination pattern and its time average over each frame of the scan. Since each frame of the scan may be equivalent to a 1-D inverse Fourier transform of a line scan of the filter in the Fourier domain, their pointwise square moduli are also equivalent. Thus the square modulus of each frame of the line scan may also be a 2-D pattern that varies only in the y-dimension and the variation of the square modulus in the y-dimension is described by the square modulus of the 1-D Fourier transform of each line scan. Due to Parseval's Theorem applied in 1-D, summation over the square modulus of each frame of the scan may be equivalent to a projection of the square modulus of 1-D inverse Fourier transform of the filter in the Fourier domain. Therefore, it is possible to synthesize a light sheet which may be the projection of a filter pattern by doing a time average of a line scan of that filter pattern in the Fourier domain.

While in practice the line scan may not be ideal and thus not a delta function, the non-ideal line scan window can be approximated as a weighted sum of several delta functions. Due to linearity of the Fourier transform, and since the measured pattern may be time-averaged, the non-ideal case approximately differs from the ideal case only by a scalar determined by the average of the non-ideal weights.

Applied to an optical system, the theorem has the following properties. In a conventionally scanned light sheet microscope, a beam that may be shaped by a mask of complex amplitude (amplitude, phase mask, or combination of both) in the Fourier plane may be scanned laterally in sample space to create a time averaged light sheet. If a focused line is scanned over the same mask in Fourier space, the same time averaged light sheet intensity may be obtained. Using a line scan over a symmetrical mask, 100% spatial duty cycle becomes possible, a simplified optical train may be used, and use of refraction instead of diffraction yields achromatic light sheet generation.

Turning now to FIG. 4, experimental one to one comparisons of Bessel and lattice (square and hexagonal) versus Field synthesis light sheets are shown. The Bessel beam light sheets are shown at 400, whereas the square lattice light sheets are shown at 402 and the hexagonal light sheets are shown at 404. Sheets A correspond to cross-sectional views of a conventionally scanned Bessel beam light sheet, while sheets B correspond to cross-sectional views a field synthesis Bessel beam light sheet, and graphs C shows line-profiles of A and B. Sheets D correspond to cross-sectional views of a conventional square lattice light sheets while sheets E correspond to cross-sectional views of a field synthesis square light sheets, and graphs F shows line profiles of D and E. Sheets G correspond to cross-sectional views of conventional hexagonal lattice light sheets while sheets H correspond to cross-sectional views of field synthesis hexagonal light sheets, and graphs I show line profiles of G and H. As shown in FIG. 4, the light sheets generated using the field synthesis techniques disclosed herein are substantially similar to light sheets generated using conventional techniques. However, as described below, the field synthesis techniques provide several advantages over the conventional approaches to generating light sheets.

Turning to FIG. 5, experimental results show that field synthesis reduces photobleaching over digitally scanned light sheet microscopy. Image A shows 100 nm fluorescent beads on a coverslip as imaged with scanned Bessel beam light sheet microscopy. Image B shows 100 nm fluorescent beads on a coverslip as imaged with Field Synthesis Bessel light sheet microscopy. Image C provides a comparison of the bleaching rate over 200 acquired volumes as imaged with Field Synthesis and Bessel Light sheet microscopy. Image D shows three time points (e.g., first, fifteenth, thirtieth) as imaged with Field Synthesis. Image E shows three time points (e.g., first, fifteenth, thirtieth) as imaged with scanned Bessel Beam light sheet microscopy.

Referring now to FIG. 6, the traditional Lattice LSM setup requires a spatial light modulator (SLM), which must be configured for a particular wavelength of light; thus dual color imaging is required to be performed sequentially. In contrast, the Field Synthesis approach of the present disclosure does not utilize an SLM and can facilitate simultaneous multi-color imaging. In this example, two laser lines of two different wavelength are scanned simultaneously over the mask to produce two light sheets of two different wavelengths simultaneously. Fluorescence imaging results with square lattice and FS demonstrate that field synthesis doubles volume rate for dual color acquisition compared to lattice light sheet. Image A shows dual color images of a MV3 cancer cell as imaged with sequential dual color square lattice light sheet microscopy at a volume rate of 0.25 Hz. Magnified views of portions of image A are shown to the right of Image A. Image B shows a MV3 cell as imaged by simultaneous dual color Field synthesis square lattice light sheet microscopy at a volume rate of 0.5 Hz. Insets to the right of Image B show magnified views of portions of Image B.

The foregoing experimental results demonstrate the Field Synthesis techniques disclosed herein may generate any scanned light sheets. Advantages exhibited by the FS process are that it may be simpler, may be more flexible, has a better spatial duty cycle, has a higher light-efficiency, and may be achromatic. The FS process also allows for rational design of light sheets (in contrast to lattice).

The experimental results detailed above were obtained using a data acquisition computer equipped with an Intel Xeon E5-2687 W v3 processor operating at 3.1 GHz with 10 cores and 20 threads, 128 GB of 2133 MHz DDR4 RAM, and an integrated Intel AHCI chipset controlling 4×512 GB SSDs in a RAIDO configuration. All software was developed using a 64-bit version of LabView 2016 equipped with the LabView Run Time Engine, Vision Development Module, Vision Run Time Module and all appropriate device drivers, including NI-RIO Drivers (National Instruments). Software communicated with the camera (Flash 4.0, Hamamatsu) via the DCAM-API for the Active Silicon Firebird frame-grabber, and delivered a series of deterministic TTL triggers with a field programmable gate array (PCIe 7852R, National Instruments). These triggers included analog outputs for control of mirror galvanometers, piezoelectric objective positioners, laser modulation and blanking, camera fire and external trigger, and inversion of the ferroelectric spatial light modulator. All images were saved in the OME-TIFF format.

Biological Sample Preparation involved culturing all cells in DMEM supplemented with 10% fetal bovine serum and penicillin/streptomycin and maintained at 37 degrees Celsius with 5% $CO_2$ atmosphere. Cells were lentiviral transduced using the pLVX-IRES-PURO and pLVX-IRES-NEO expression systems.

Figure 7A:
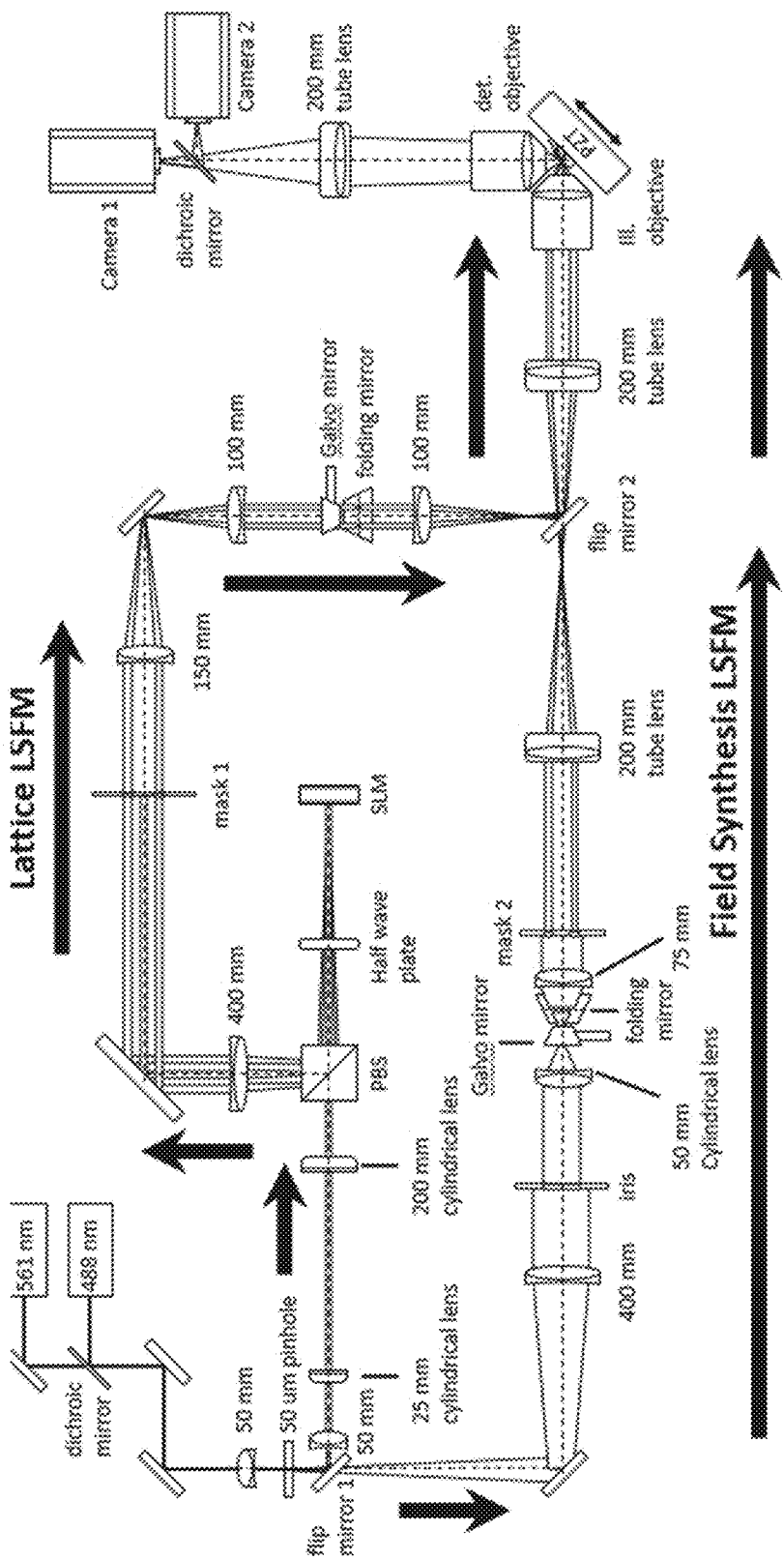
FIG. 7A is a block diagram illustrating a microscopy apparatus capable of generating lattice and field synthesis light sheets set up in fluorescence mode according to one or more aspects of the present disclosure.
Figure 8A:
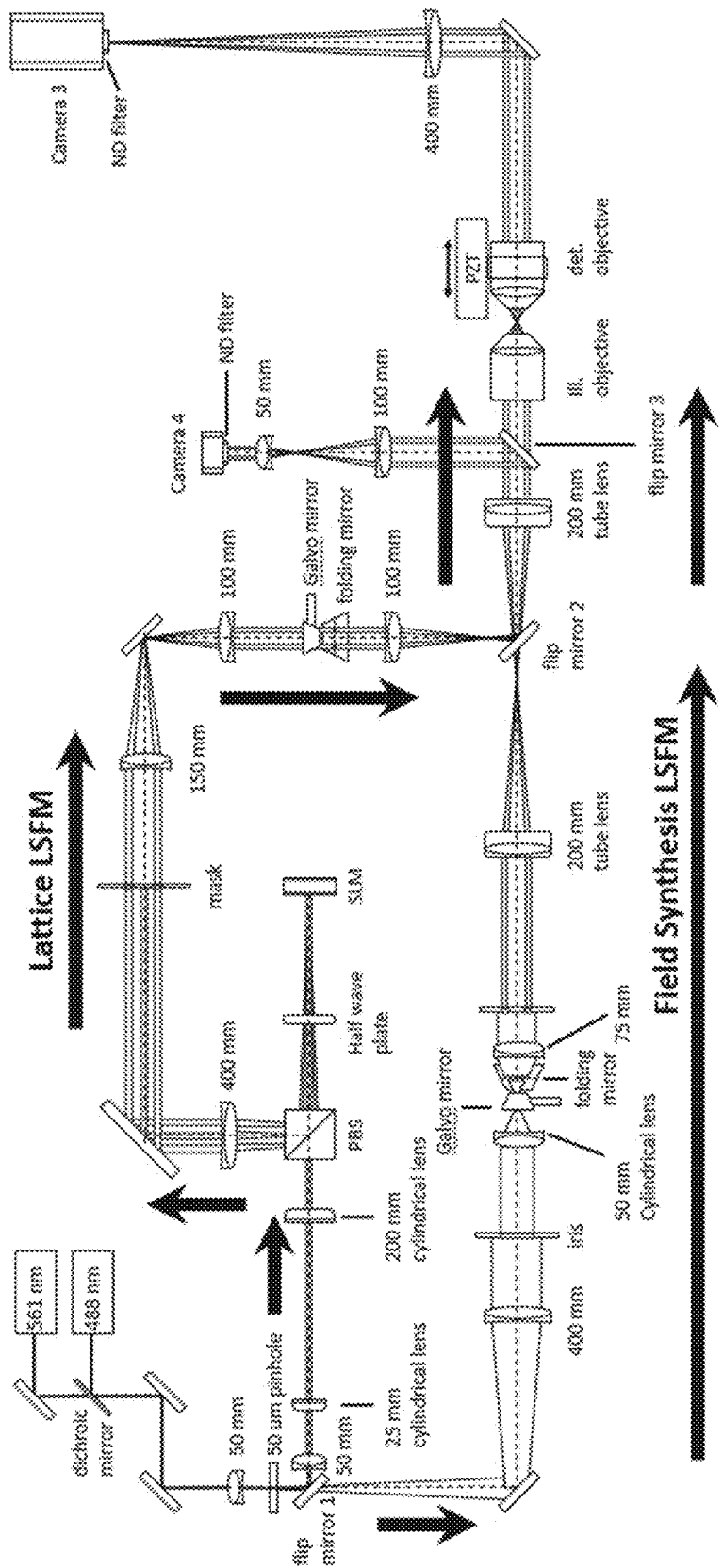
FIG. 8A is a block diagram illustrating a microscopy apparatus set up in transmission mode capable of generating lattice and field synthesis light sheets to acquire images as shown in FIG. 4 and FIG. 9.

FIGS. 7A and 8A illustrate light sheet microscopy apparatuses that were used to perform the experiments that obtained the results detailed above. These setups have dual paths to facilitate comparison of the traditional lattice and field synthesis lattice approaches. The setup consists of two illumination paths, one for conventional lattice light sheets and one for field synthesis. Either path can be selected by flip mirrors.

Figure 7B:
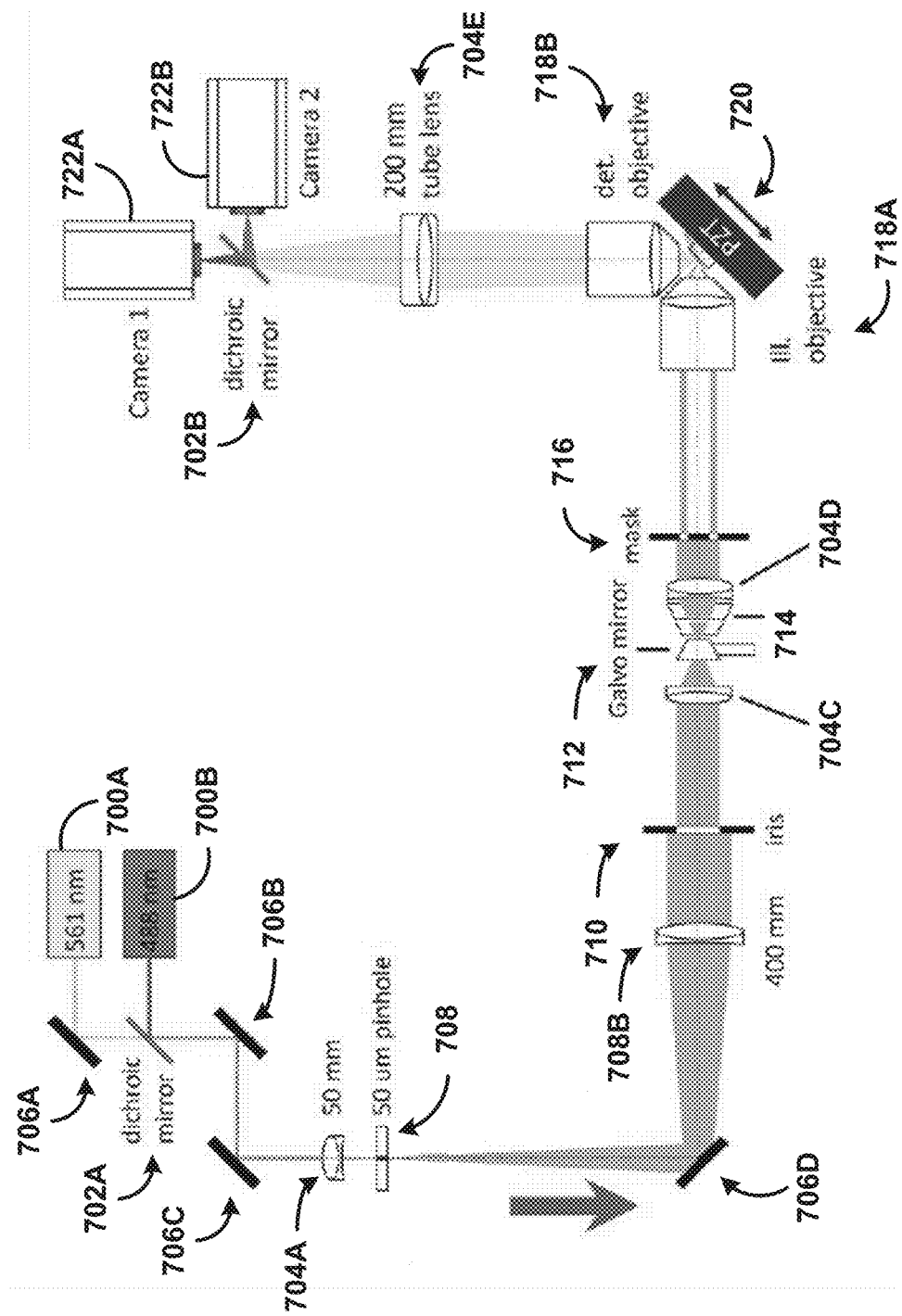
FIG. 7B is a block diagram illustrating a Field Synthesis light sheet microscopy apparatus set up in fluorescence mode according to one or more aspects of the present disclosure.
Figure 8B:
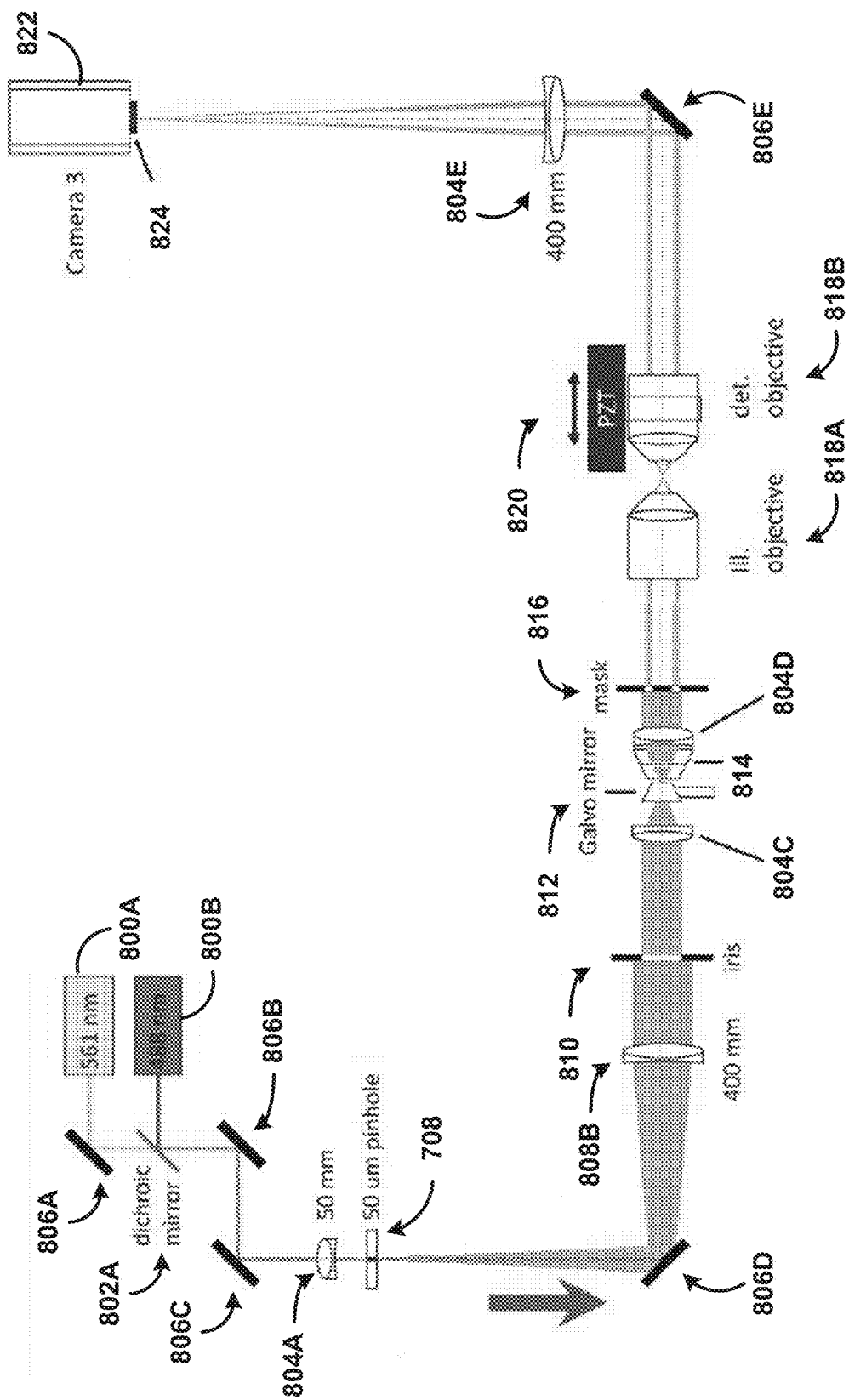
FIG. 8B is a block diagram illustrating a light sheet microscopy apparatus set up in transmission mode to acquire images as shown in FIG. 4 and FIG. 9.

FIGS. 7A and 7B depict the microscopes in fluorescence mode, while FIGS. 8A and 8B depict the microscopes in transmission mode. Transmission mode was used to measure the light sheets shown in FIG. 4, whereas fluorescence mode was used for the data shown in FIG. 5 and FIG. 6. FIG. 7B illustrates example components of Field Synthesis light sheet microscopes according to the present disclosure. FIG.

8B illustrates components of a setup that was used to measure the properties of light sheets produced by Field Synthesis.

The microscope of FIG. 7B has laser light sources 700A and 700B, dichroic mirrors 702A and 702B, lenses 704A-704E, mirrors 706A-706D, pinhole 708, iris 710, galvanometric mirror 712, folding mirror 714, mask 716, illumination and detection objectives 718A and 718B, PZT scanning stage 720, and cameras 722A and 722B. A biological sample may be connected to a piezoelectric scanning stage (PZT) 720. Laser light sources 700A and 700B and dichroic mirror 702A are examples of light sources 102 (see FIG. 1), and galvanometric mirror 712 is an example of scanning devices 106 (see FIG. 1). Likewise, mask 716 is an example of spatial light filters 110 (see FIG. 1), and illumination and detection objectives 718A and 718B, PZT scanning stage 720, dichroic mirror 702B, and cameras 722 are examples of imaging devices 114 (see FIG. 1). While FIG. 7B depicts use of lasers of two different colors, it should be understood that a monochromatic microscope may be implemented by removing one of the lasers, the dichroic mirrors, and one of the cameras. In this case, the light beam from the single laser may be directed through the pinhole to lens 704B, with or without aid of one or more of mirrors 706A-706 D.

The microscope of FIG. 8B has laser light sources 800A and 800B, dichroic mirror 802, lenses 804A-804E, mirrors 806A-806E, pinhole 808, iris 810, galvanometric mirror 812, folding mirror 814, mask 816, illumination and detection objectives 818A and 818B, PZT 820, and camera 822 with an ND filter 824. A biological sample may be positioned between illumination and detection objectives 818A and 818B. Laser light sources 800A and 800B and dichroic mirror 802 are examples of light sources 102 (see FIG. 1), and galvanometric mirror 812 is an example of scanning devices 106 (see FIG. 1). Likewise, mask 816 is an example of spatial light filters 110 (see FIG. 1), and illumination and detection objectives 818A and 818B, PZT 820, cameras 722, and ND filter 724 are examples of imaging devices 114 (see FIG. 1). While FIG. 8B depicts use of lasers of two different colors, it should be understood that a monochromatic microscope may be implemented by removing one of the lasers and the dichroic mirror. In this case, the light beam from the single laser may be directed through the pinhole to lens 704B, with or without aid of one or more of mirrors 706A-706 D.

Figure 9:
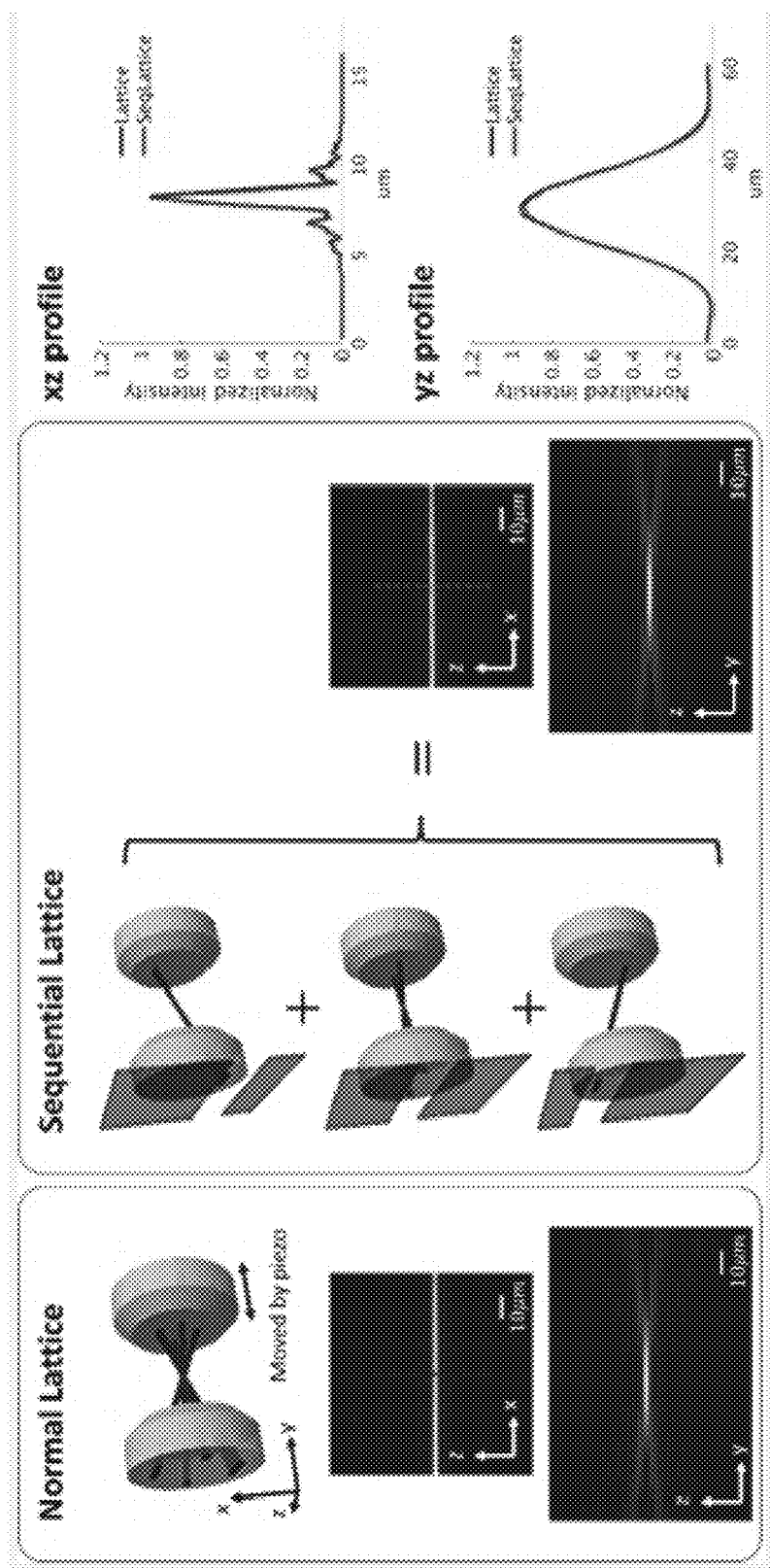
FIG. 9 is a graphical illustration demonstrating normalized intensity for a normal lattice and a sequential lattice according to one or more aspects of the present disclosure.

FIG. 9 demonstrates normalized intensity for a normal lattice and a sequential lattice. In sequential lattice mode, the three diffraction orders of a square lattice pattern were individually selected by a slit mask in Fourier space. Each order was separately imaged in image space and the three data sets were added. This process "simulates" the Field synthesis process and allows fair comparison to the results of a conventionally produced lattice light sheet. The data shows that light sheets virtually identical to conventional lattice light sheets can be produced by purely 1-D functions using the sequential lattice approach to simulate field synthesis results.

Figure 10:
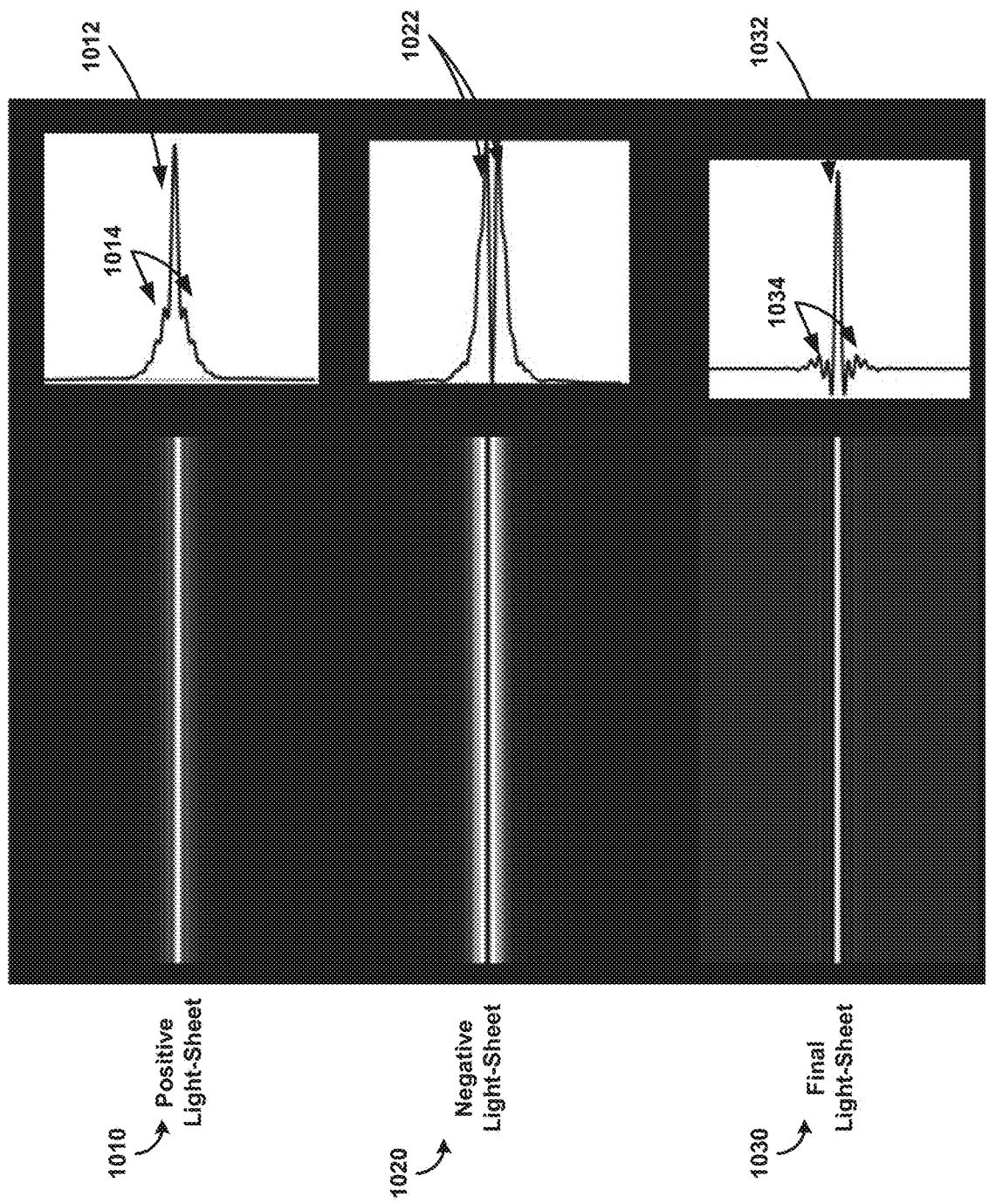
FIG. 10 illustrates aspects of generating positive and negative light sheets using field synthesis in accordance with aspects of the present disclosure.

While the field synthesis techniques described above have been shown to produce light sheets that are comparable to light sheets produced by conventional systems and methods, the field synthesis approach provides several additional advantages that improve the capabilities of imaging systems configured to generate light sheets using the field synthesis approach disclosed herein. An imaging system operating in accordance with the present disclosure may generate positive and negative light sheets via field synthesis. For example, an imaging system may generate a positive light sheet by scanning a beam of light across a filter, as described above, and then an optical characteristic of the beam of light may be changed to generate a negative light sheet. The optical characteristic may be changed by altering a polarity of the beam of light using a polarizer or by using a glass plate configured to alter the phase of the beam of light. Utilizing a polarizer to change the polarity of the beam of light has the advantage of working for different types of light. An example of the resulting positive and negative light sheets is shown in FIG. 10. As shown in FIG. 10, the positive light sheet 1010 may be generated based on illumination of a sample as light is scanned across the filter, as described above. The negative light sheet 1020 may not capture light at the highest intensity points of the positive light sheet 1010, as indicated by the dark region spanning across the middle region of the negative light sheet 1020. The positive light sheet 1010 and the negative light sheet 1020 may be combined to produce a final light sheet 1030. For example, the negative light sheet 1020 may be subtracted from the positive light sheet 1010 to produce the final light sheet 1030.

Figure 11:
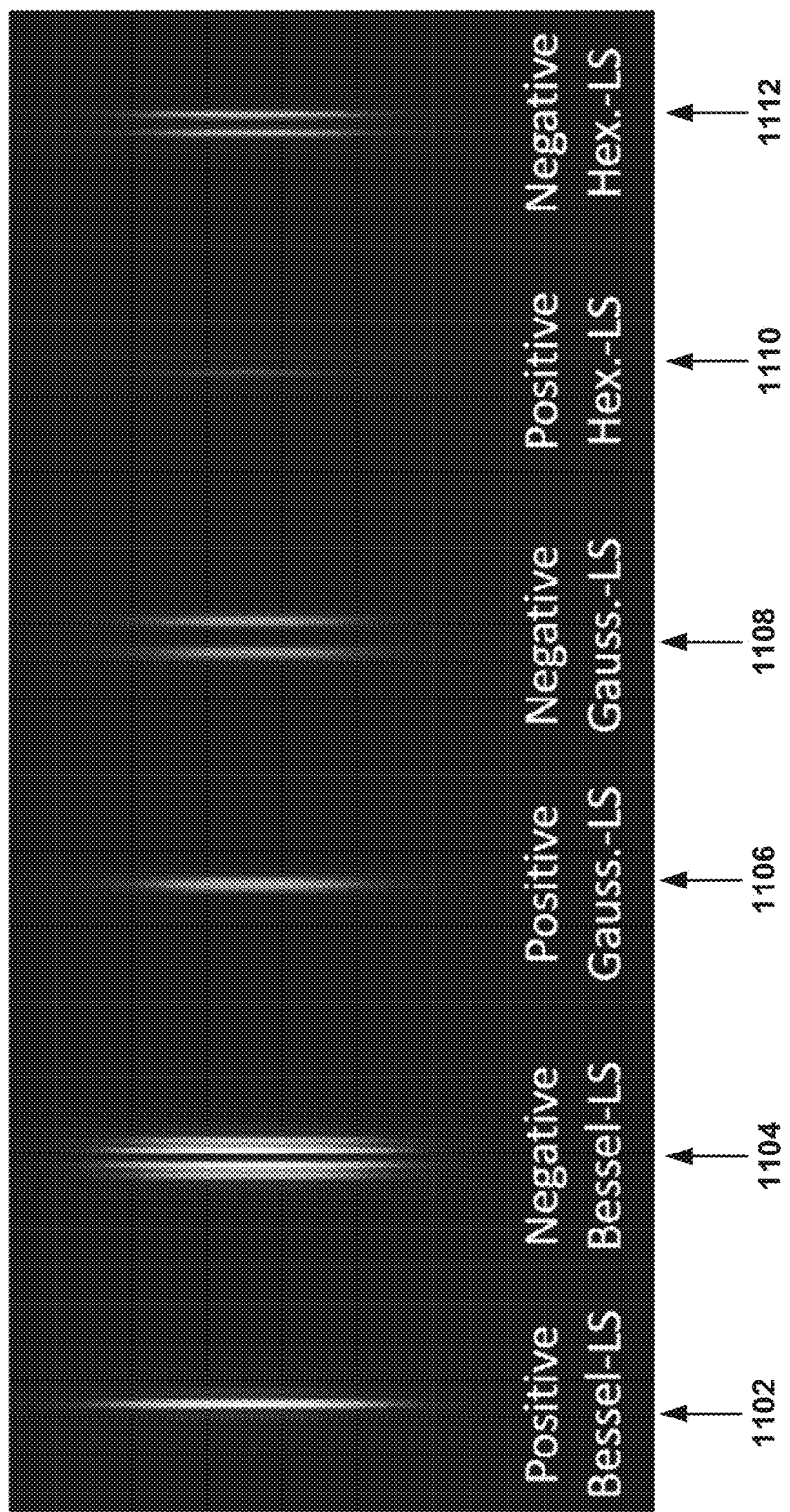
FIG. 11 illustrates positive and negative light sheets for different types of light sheets using field synthesis in accordance with aspects of the present disclosure.

As illustrated in FIG. 10, the final light sheet 1030 may be thinner than the positive light sheet 1010. Generating final images of a sample using thinner light sheets 1030 may reduce blur and improve the sharpness of the resulting image. For example, as shown on the right side of FIG. 10, the positive light sheet 1010 may have a primary lobe 1012 corresponding to the area of interest for the positive light sheet 1010 and side lobes 1014 corresponding to blur or haze produced during the imaging process. In contrast, the negative light sheet 1020 has two side lobes 1022 that are larger than the side lobes 1014 and no primary lobe. By combining the positive light sheet 1010 and negative light sheet 1020, the final light sheet 1030 includes a thinner primary lobe 1032 and smaller side lobes 1034. Such illustration demonstrates that the final light sheet 1030 is thinner than the positive light sheet 1010 and has less blur or haze (as illustrated by the smaller side lobes 1034), which results in an image that is more clear than using only positive light sheets. FIG. 11 illustrates various positive and negative lights-sheets that may be generated via field synthesis for different light sheet types. For example, a positive Bessel light sheet is shown at 1102 and a negative Bessel light sheet is shown at 1104. At 1106 and 1108, positive and negative light sheets, respectively, are shown for Gaussian light sheets, and at 1110 and 1112, positive and negative light sheets, respectively, are shown for Hexagonal light sheets.

Figure 12A:
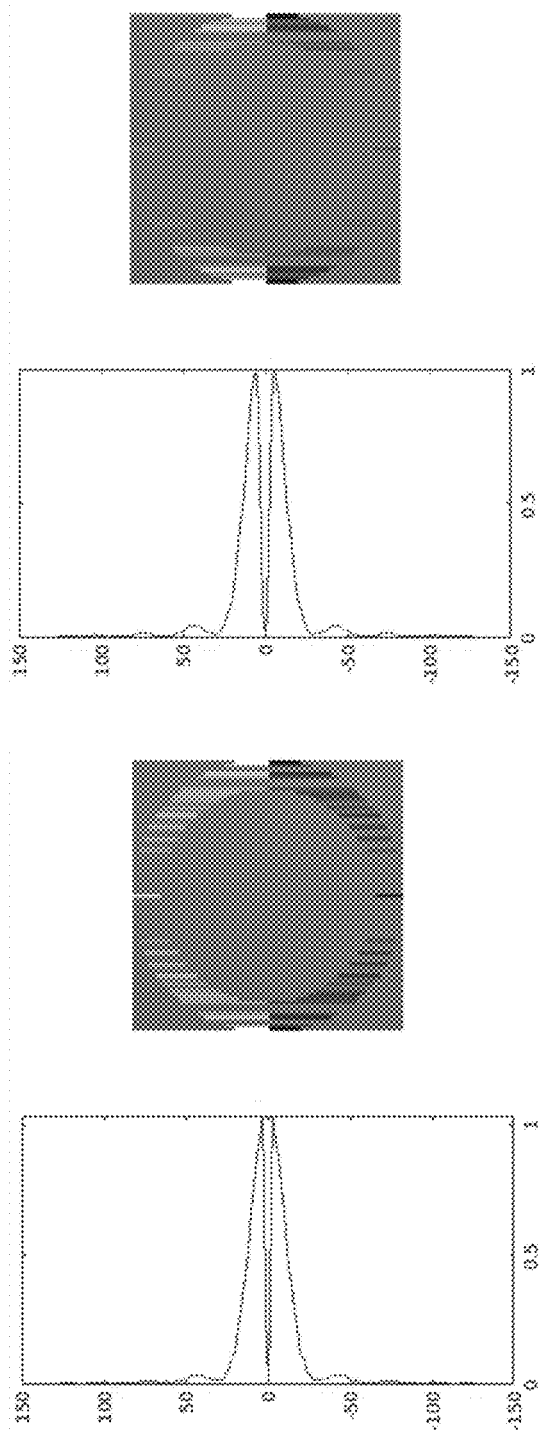
FIG. 12A shows images illustrating aspects of tuning a lighsheet generated using field synthesis in accordance with the present disclosure.
Figure 12B:
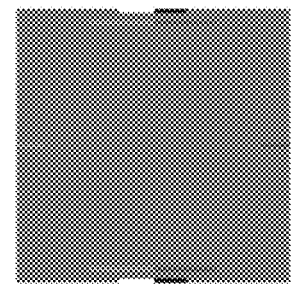
FIG. 12B shows images illustrating aspects of tuning a lighsheet generated using field synthesis in accordance with the present disclosure.
Figure 12C:
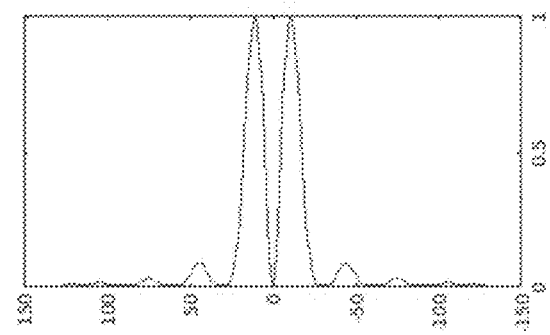
FIG. 12C shows images illustrating aspects of tuning a lighsheet generated using field synthesis in accordance with the present disclosure.

In addition to enabling the sharpness and image quality to be improved through the use of positive and negative light sheets, the field synthesis approach disclosed herein also enables tuning of characteristics of individual light sheets, regardless of whether it is a positive light sheet or a negative light sheet. Referring to FIGS. 12A-12C, aspects of tuning characteristics of a light sheet generated via field synthesis are shown. In each of FIGS. 12A-1, a line profile associate with a light sheet generated by scanning the light across the filter at specific locations is shown. As can be seen in FIGS. 12A-12C, the generated light sheets are negative light sheets (as indicated by the absence of a primary lobe and the presence of two large side lobes). Additionally, a size of the gap between the two side lobes is different for each of the line profiles. As the size of the gap increases or decreases, the size of the resulting light sheet (e.g., when the negative light sheet is combined with a corresponding positive light sheet) may be adjusted. On the right side of FIGS. 12A-12C, scan patterns depicting locations where the light was scanned across the filter are shown. These scan patterns demonstrate that by scanning the light across the filter at different locations, the characteristics of the resulting light sheets may be tuned.

In an aspect, the properties described above may be utilized to engineer light sheets having particular properties. For example, a line profile of a light sheet having particular properties (e.g., blur, as indicated by the sidelobes, thickness of the light sheet, etc.) may be determined and a scanning pattern for generating the light sheet with the desired properties. This process may be performed for both a positive light sheet and a negative light sheet and may result in different scanning patterns being used to generate each of the light sheets.

To achieve the above-described functionality, an optimization procedure may be employed to approximate an arbitrary nonnegative target intensity illumination pattern. The procedure described herein allows each position of the line scan to be considered separately since the resulting illumination pattern of each line may be incoherently added together. A weight may be assigned to each position of the line scan to increase the contribution of its resulting illumination pattern. This weight could be physically assigned, for example, by either increasing the intensity of the incident light during that portion of the line scan, by altering the rate of the line scan, or by using amplitude modulation in a spatial light modulator. The optimization problem to be solved is to determine the nonnegative weights to assign each portion of the line scan such that the resulting illumination patterns sum to the target illumination pattern.

In an ideal case, where the instantaneous illumination on the back focal plane is a delta function, an infinitely thin line, the resulting intensity illumination pattern at the sample focal plane varies only in a single dimension, z. Thus, the illumination pattern from each instantaneous sample may be described by a one-dimensional function as a function of z. This function can be discretized by sampling and encoded into a column of a matrix. Thus, a matrix, "C", can be constructed where each column corresponds to the intensity illumination pattern resulting from each portion of the line scan. A set of weights, one for each column of the matrix, can be formed into a column vector, "x". The multiplicative product of the matrix and the column vector, "Cx" then results in a column vector describing the final weighted illumination pattern, "d". Similarly, the target intensity illumination pattern can also be similarly sampled and encoded into a column vector. The difference between the column vectors describing the multiplicative product and the target intensity illumination pattern, "Cx-d" is then a column vector describes the error between the illumination pattern from a given set of weights and the target. A solution to the optimization problem would be a set of weights, "x" that minimizes a norm of "Cx-d".

A least squares approach using the L2-norm where each element of the error column vector is squared and summed together may be used. For the L2-norm, this square root of the sum is taken as the value of the norm. However, minimizing the square of the L2-norm may be sufficient to solve the optimization problem. In some circumstances, such as when a single camera exposure is used, only nonnegative weights may be considered. In this case, a constrained least squares optimization may be used. By solving the optimization problem, a set of weights is determined that for a certain mask or more generally a set of line scan profiles will produce the closest approximation to a target profile for that mask.

Since the mask could be changed by either physically changing a static mask or using a spatial light modulator to electronically or optically modulate the amplitude of the light transmitted, the available line scan profiles could be expanded to a set larger than one available in a single static mask. Thus, the optimization could utilize line scan profiles available across several distinct masks. Another application would be to use the optimization procedure to find weights from a broad range of line scan profiles to approximate a mask and then use the largest magnitude weights in order to construct a new mask with the corresponding line scan profiles.

For a non-ideal case, where the pattern used in the horizontal scan is not infinitely thin, or perhaps a more complex pattern, the generalized field synthesis theorem can be applied to predict the resulting 2D pattern which depends on the inverse Fourier transform of the horizontal scan profile. To adapt the above optimization for this case, one or more slices along the z-dimension can selected for optimization. Multiple axial slices can be formed into a single 1D column by concatenating them along the axial dimension for each portion of the line scan. Distinct portions of the line scan can be horizontally concatenated to form the matrix, "C" as described above.

The propagation properties of the field synthesis scan can also be optimized in a similar fashion. Each portion of the field synthesis scan may be associated with a propagation profile (e.g., in the y-direction). A one-dimensional propagation profile can be determined by selecting the intensity profile along y at x=0, z=0, or any other fixed position of x and z, for each portion of the scan. This propagation profile can be determined either through measurement or simulation. Simulations of the propagation profile can be determined through fast focus field calculations of the Debye diffraction integral. This one-dimensional propagation profiles are then assembled as columns of the matrix, "C", and then target propagation profiles can approximated through the optimization procedure above.

Three-dimensional optimization of the field synthesis generated light sheet is also permitted by this procedure. A combination of slices in both the axial and lateral directions of the light sheet could be sampled and concatenated into a single one-dimensional column vector for each portion of the line scan. The column vectors could then be further concatenated across rows to form the matrix "C", which could then be used in an optimization procedure as above.

Figure 13B:
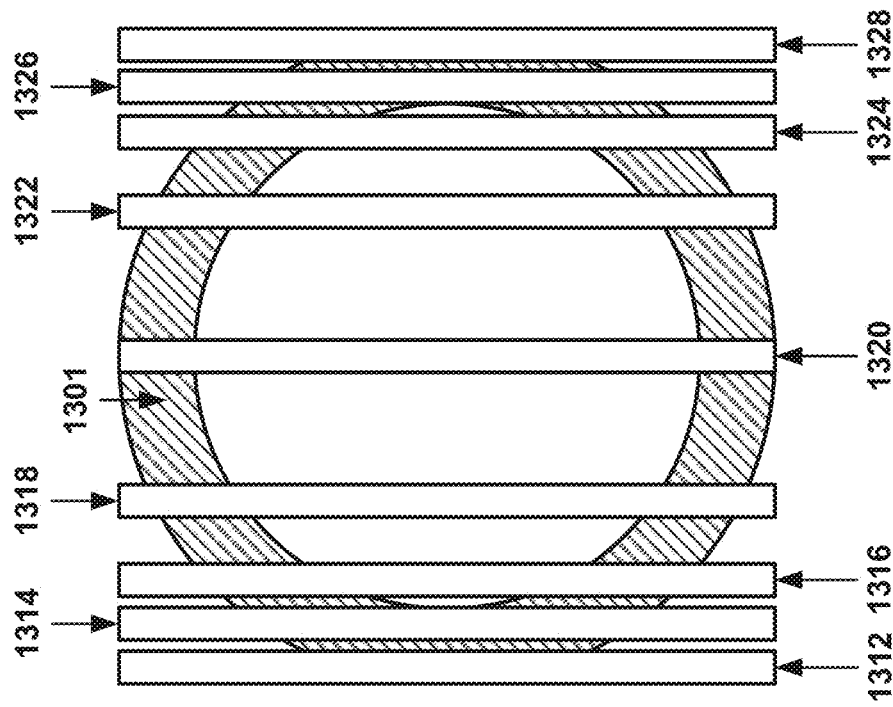
FIG. 13B is a block diagram illustrating selective illumination of a sample to generate a light sheet having desired properties via field synthesis in accordance with aspects of the present disclosure.
Figure 13A:
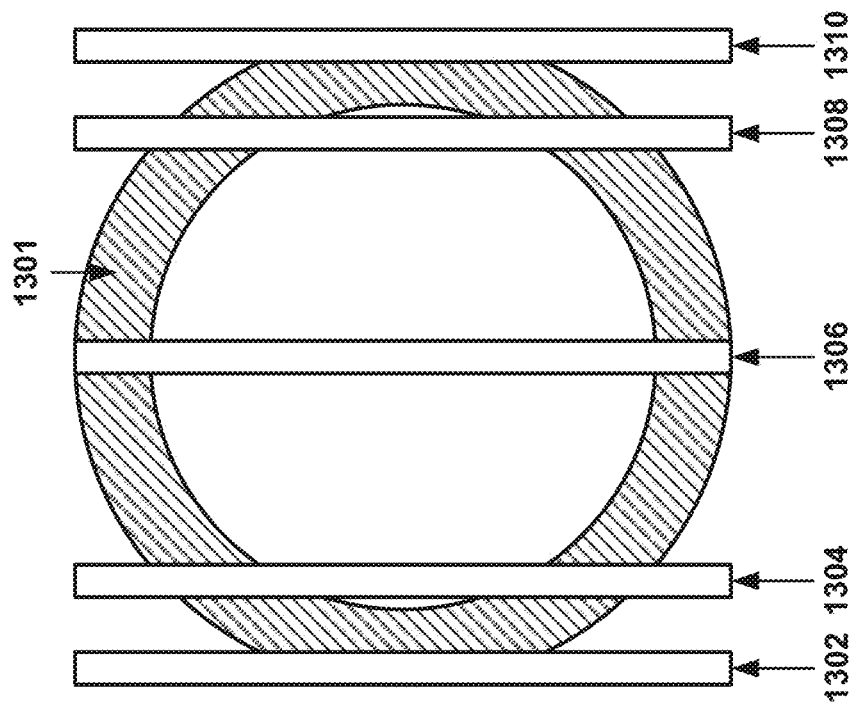
FIG. 13A is a block diagram illustrating selective illumination of a sample to generate a light sheet having desired properties via field synthesis in accordance with aspects of the present disclosure.

To facilitate the scanning of the light at the specific locations indicated in each of FIGS. 12A-12C, the light source may be turned on and off at specific times during the scanning, thereby resulting in the light being passed through the filter at different locations, including having some locations where light may not be scanned across the filter. For example and referring to FIGS. 13A-13B, a block diagram illustrating exemplary aspects of selectively scanning light across a filter to control characteristics of a light sheet via field synthesis are shown. In FIGS. 13A and 13B, a filter 1301 is shown. In FIG. 13A, the light is scanned across the filter 1301 at locations 1302, 1304, 1306, 1308, and 1310. As described above, the light may be scanned at these particular locations by turning the light source on and off during the scanning. Alternatively, the light may be shuttered as opposed to turning the light source on and off. In FIG. 13B, the light is scanned across the filter 1301 at locations 1312, 1314, 1316, 1318, 1320, 1322, 1324, 1326, and 1328. Because the light is scanned at different locations and more locations in FIG. 13B as compared to FIG. 13A, the resulting light sheets may have different characteristics.

In addition to selectively scanning the beam(s) of light at particular locations (which may not be directly adjacent) to tune the light sheet, as described above, the intensity of the beam(s) may be modified during the scanning. For example, as the beam(s) is scanned across the filter, the power or intensity of the beam(s) may be varied. The intensity/power adjustments may be utilized without the selective illumination of specific portions of the filter, such as to adjust the intensity/power of the of the beam(s) at each of the locations 1312, 1314, 1316, 1318, 1320, 1322, 1324, 1326, and 1328, or may vary the power/intensity of the of the beam(s) at certain times (corresponding to particular locations) during a continuous scan (e.g., a scan of the beam(s) across the entire filter without selectively shuttering the beam of light or turning the light source on and off).

The ability to tune light sheets, including positive light sheets and negative light sheets, in this way provides a robust way to balance the tradeoff between sharpness and blur, amongst other characteristics, of the resulting images. For example, while scanning the light across the entire filter 1301 may result in a light sheet that provides a suitable image, scanning the light across less than the full range of possible locations may result in an image that has less blur or provides some other characteristic that may be desirable. For example, while FIG. 10 illustrates that using positive and negative light sheets may enable tuning of the thickness of the light sheet used for image acquisition, the scanning techniques illustrated in FIGS. 12A-13B may enable tuning of the thickness and length of the light sheet. In FIG. 10, the light sheets 1010, 1020, 1030 illustrate the thickness and the width, and the length of the light sheets is the dimension orthogonal to the images 101, 1020, 1030. These capabilities may further enhance the capabilities of imaging systems implementing the field synthesis techniques disclosed herein. It is noted that the various concepts described above with reference to FIGS. 10-14B may be utilized separately or in combination. For example, positive light sheets and negative light sheets may be generated using a same scanning pattern or different scanning patterns (e.g., generate the positive light sheet using a continuous scanning pattern and generate the negative light sheet using a selective scanning pattern where the beam of light is shuttered/turned on/off at particular locations, as described with reference to FIGS. 12A-13B, etc.) or the intensity of the beam may be varied at different intensity levels and/or at different locations during the scan for the positive and negative light sheets. An additional advantage that the above-identified capabilities provides is the ability to utilize positive and negative light sheets in connection with optically activated fluorophores, which are activated when illuminated by a light beam with specific wavelength, and deactivated and read out by light beams with another wavelength. For example, the positive light sheet may activate the fluorophores, allowing the sample to be imaged based on the emitted fluorescence, and the negative light sheet may deactivate the fluorophores above and below the center of the positive light sheet. A final positive light sheet may read out the fluorophores that only remain at the center of the positive light sheet. In such case, the imaging has less blur from the out of focus plane, which improves the axial resolution of the final image. The above mentioned capabilities might be used to tune the thickness and aspect ratio (how long the light sheet is in the propagation direction of the beam), such as by utilizing selective activation or illumination of portions of the optical filter as described above, and the amount of sidelobes and blur that are generated above and below the light sheet, such as by using the above-described techniques for advantageously illuminating optically activated fluorophores. This can be achieved by engineering the pupil filter and the scan patterns for a single light sheet, or the synergistic combination of positive and negative light sheets. It is also noted that the above-described techniques may be utilized individually (e.g., in standalone applications where selective illumination is used without optically activated fluorophores or optically activated fluorophores are used without selective illumination) or in combination.

Figure 14B:
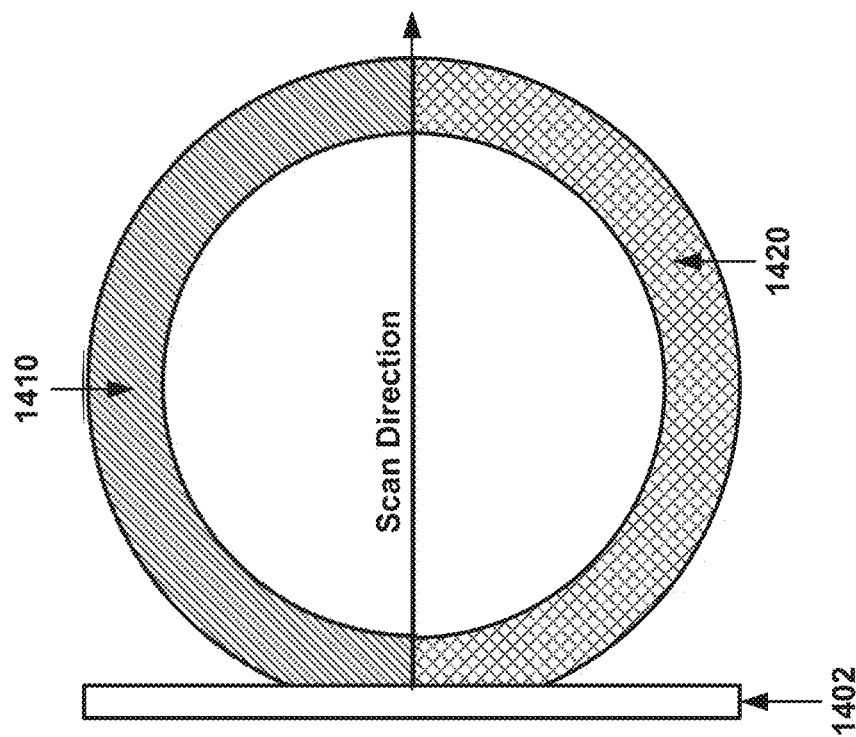
FIG. 14B is a block diagram illustrating generation of a negative light sheet via field synthesis in accordance with aspects of the present disclosure.
Figure 14A:
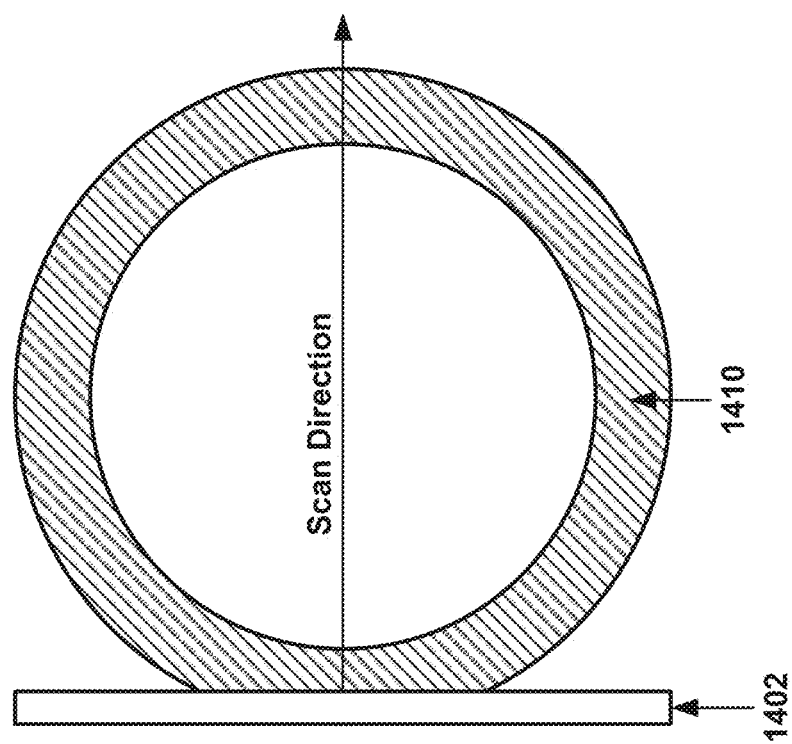
FIG. 14A is a block diagram illustrating generation of a positive light sheet via field synthesis in accordance with aspects of the present disclosure.
Figure 15B:
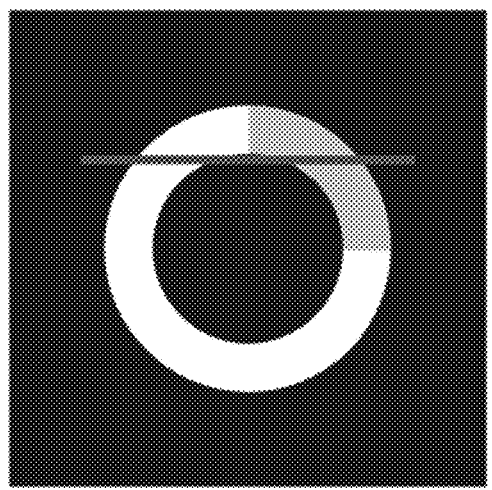
FIG. 15B is a block diagram illustrating generation of a negative light sheet via field synthesis in accordance with aspects of the present disclosure.
Figure 15B:
Figure 15B:
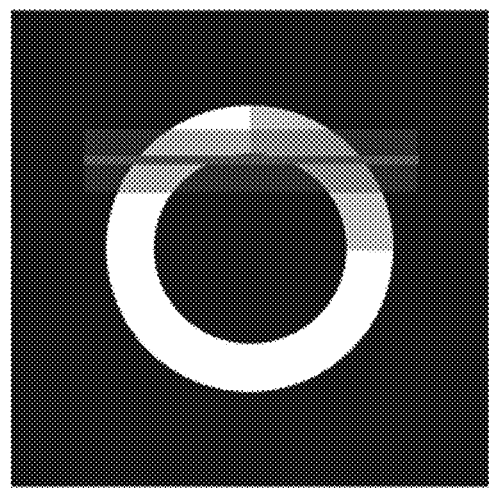
Figure 15A:
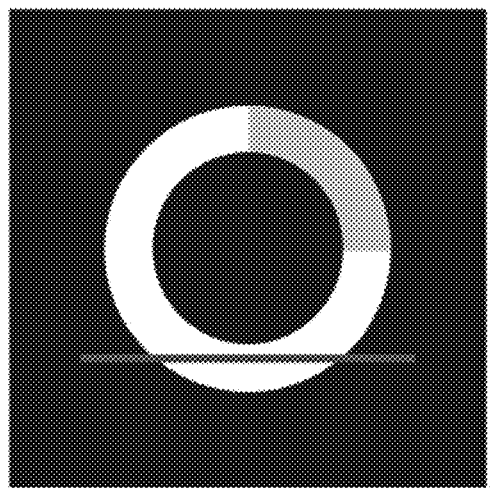
FIG. 15A is a block diagram illustrating generation of a positive light sheet via field synthesis in accordance with aspects of the present disclosure.
Figure 15A:
Figure 15A:
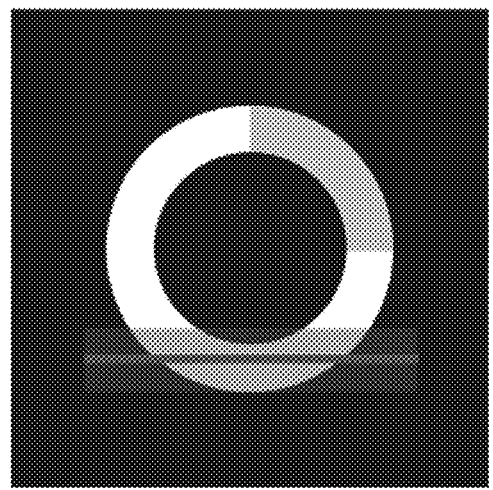

As described above, the negative light sheets may be generated by applying a phase shift to the light that is scanned across at least a portion of the filter. Referring to FIGS. 14A and 14B, block diagrams illustrating exemplary aspects of generating positive and negative light sheets via field synthesis are shown. In FIG. 14A, light 1402 is scanned across a filter 1410 in a scan direction. The phase shift may be applied to the light passing through the portion 1420 of the filter 1410 using a polarizer or a piece of glass having an appropriate thickness to induce the desired phase shift. The light may be scanned across the entire filter 1410, the portion 1420 of the filter 1410, or at specific locations of the filter 1410, as described above with reference to FIGS. 12A-13B. This also indicates the filter 1420 does not need to fill the entire lower half of filter 1410. For example, the positive and the negative light sheets can be generated as shown with reference to FIGS. 15A and 15B. As it can be seen in FIGS. 15A and 15B, the filter 1420 is applied to only ¼ of the filter 1410. When the light is placed or scanned at the filter without phase shift (e.g., lower image in FIG. 15A), the positive light-sheet is generated. In contrast, the negative light-sheet may be generated when the light sheet is placed or scanned at the filter with the phase shift (e.g., lower image in FIG. 15B).

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A light sheet microscopy apparatus comprising:
one or more light sources configured to generate one or more light beams;
one or more spatial light filters;
one or more scanning devices positioned between the one or more light sources and the one or more spatial light filters, the one or more scanning devices being controllable to scan the one or more light beams across the one or more spatial light filters, a positive light sheet and a negative light being synthesized by incoherent superposition of one-dimensional intensity distributions from the one or more light beams scanned across the one or more spatial light filters; and
one or more imaging devices configured to capture one or more images of light emitted by a sample illuminated by a final light sheet that is a combination of the positive light sheet and the negative light sheet.

2. The apparatus of claim 1, wherein the one or more light sources includes one or more lasers.

3. The apparatus of claim 1, wherein the one or more scanning devices includes one or more galvanometric mirrors.

4. The apparatus of claim 1, wherein the one or more spatial light filters includes a pupil filter conjugate to a back focal plane.

5. The apparatus of claim 1, wherein the one or more imaging devices includes one or more cameras.

6. The apparatus of claim 1,
wherein,
the one or more scanning devices are moved in one dimension in a first plane parallel to a second plane, and
the second plane contains a principal impingement surface of the one or more spatial light filters.

7. The apparatus of claim 1, wherein one or more focused lines are scanned across the one or more spatial light filters.

8. The apparatus of claim 1, wherein the one or more imaging devices are configured to capture sequential images of the light emitted by the sample.

9. The apparatus of claim 1,
wherein,
the one or more imaging devices are configured to acquire fluorescence light of different wavelength ranges while the sample is illuminated by the one or more light sheets, and
the one or more light sheets have different wavelengths.

10. A method for a light sheet microscopy, the method comprising:
generating one or more light beams using one or more light sources;
scanning the one or more light beams across one or more spatial filters using one or more scanning devices disposed between the one or more light sources and the one or more spatial filters;
synthesizing a plurality of light sheets by incoherent superposition of intensity distributions varying in at least one dimension from the one or more light beams being scanned across the one or more spatial filters, the plurality of light sheets including a positive light sheet and a negative light sheet;
combining the positive light sheet and the negative light sheet into a final light sheet; and
capturing one or more images of light emitted by a sample illuminated by the final light sheet, the one or more images of light being captured using one or more imaging devices.

11. The method of claim 10, wherein the one or more light sources includes one or more lasers.

12. The method of claim 10, wherein the one or more scanning devices includes one or more galvanometric mirrors.

13. The method of claim 10, wherein the one or more spatial filters includes at least one of a pupil filter or a slit mask.

14. The method of claim 10, wherein the one or more imaging devices includes one or more cameras.

15. The method of claim 10,
wherein,
the scanning of the one or more light beams across the one or more spatial filters includes moving the one or more scanning devices in one dimension in a first plane parallel to a second plane, and
the second plane contains a principal impingement surface of the one or more spatial filters.

16. The method of claim 10, wherein the scanning of the one or more light beams across the one or more spatial filters includes scanning one or more focused lines across the one or more spatial filters.

17. The method of claim 10, wherein the capturing of the one or more images of light includes capturing sequential images of light emitted by the sample.

18. The method of claim 17,
wherein,
the capturing of the one or more images of light includes acquiring fluorescence light of different wavelength ranges while the sample is illuminated by the one or more light sheets, and
the one or more light sheets have different wavelengths.

19. The method of claim 10, further comprising:
applying a phase shift to at least a portion of the one or more light beams scanned across the one or more spatial filters to generate the negative light sheet.

20. The method of claim 10, further comprising:
tuning one or more characteristics of the plurality of light sheets by controlling the one or more light beams being scanned across the one or more spatial filters.

21. A non-transitory computer-readable medium having instructions recorded thereon that, when executed by one or more computer processors, cause the one or more computer processors to perform operations, the operations comprising:
operating one or more light sources to generate one or more light beams;
controlling one or more scanning devices disposed between the one or more light sources and one or more spatial light filters, the one or more scanning devices being controlled to scan the one or more light beams across the one or more spatial light filters, a positive light sheet and a negative light being synthesized by incoherent superposition of intensity distributions varying in a primary direction from the one or more light beams being scanned across the one or more spatial filters; and
capturing one or more images of light emitted by a sample illuminated by a final light sheet that is a combination of the positive light sheet and the negative light sheet, the one or more images of light being captured using one or more imaging devices.

22. A non-transitory computer-readable medium having instructions recorded thereon that, when executed by one or more computer processors, cause the one or more computer processors to perform operations, the operations comprising:
generating one or more images of light emitted by a sample illuminated by a final light sheet that is a combination of a positive light sheet and a negative light sheet, the positive light sheet and the negative light sheet being synthesized by incoherent superposition of one-dimensional intensity distributions from one or more light beams being scanned across one or more spatial filters by controlling one or more scanning devices, the one or more scanning devices disposed between one or more light sources generating the one or more light beams and the one or more spatial filters.

23. The apparatus of claim 1, wherein the positive light sheet and the negative light sheet are synthesized by the incoherent superposition of one-dimensional intensity distributions from the one or more light beams scanned across the one or more spatial light filters conjugate to a back focal plane.

* * * * *